United States Patent
Cook et al.

(10) Patent No.: US 12,527,826 B2
(45) Date of Patent: Jan. 20, 2026

(54) TREATMENT OF WHITE FECES SYNDROME IN SHRIMP

(71) Applicant: CAN TECHNOLOGIES, INC., Wayzata, MN (US)

(72) Inventors: David A. Cook, Coon Rapids, MN (US); Alejandro Makol Arenas, Cambrils (ES); Jose Miguel Troncoso, Puerto Varas (CL); Karola Wendler, St. Peter am Wimberg (AT)

(73) Assignee: CAN TECHNOLOGIES, INC., Wayzata, MN (US)

( * ) Notice: Subject to any disclaimer, the term of this patent is extended or adjusted under 35 U.S.C. 154(b) by 199 days.

(21) Appl. No.: 18/687,951

(22) PCT Filed: Sep. 2, 2022

(86) PCT No.: PCT/US2022/075952
§ 371 (c)(1),
(2) Date: Feb. 29, 2024

(87) PCT Pub. No.: WO2023/034998
PCT Pub. Date: Mar. 9, 2023

(65) Prior Publication Data
US 2025/0127833 A1  Apr. 24, 2025

Related U.S. Application Data

(60) Provisional application No. 63/240,200, filed on Sep. 2, 2021.

(51) Int. Cl.
*A61K 36/185* (2006.01)
*A23K 10/30* (2016.01)
(Continued)

(52) U.S. Cl.
CPC ............ *A61K 36/185* (2013.01); *A23K 10/30* (2016.05); *A23K 20/158* (2016.05); *A23K 40/30* (2016.05); *A23K 50/80* (2016.05); *A61K 31/085* (2013.01); *A61K 31/165* (2013.01); *A61K 36/064* (2013.01); *A61K 36/79* (2013.01); *A61K 36/81* (2013.01); *A61P 3/02* (2018.01)

(58) Field of Classification Search
CPC .. A61K 36/185; A61K 31/085; A61K 31/165; A61K 36/064; A61K 36/79; A61K 36/81; A23K 10/30; A23K 20/158; A23K 40/30; A23K 50/80; A61P 3/02
See application file for complete search history.

(56) References Cited

FOREIGN PATENT DOCUMENTS

CN    110178973 A    8/2019
WO    2017037157 A1  3/2017

OTHER PUBLICATIONS

Aquaculture Magazine, Delacon enters aqua market with Syrena Boost, Aug. 15, 2020, 2 pages. (Year: 2020).*

(Continued)

*Primary Examiner* — Trevor Love

(57) ABSTRACT

Shrimp feeds and additives for preventing, reducing the occurrence of, treating, and/or facilitating recovery from white feces syndrome in shrimp. A shrimp feed additive or shrimp feed includes a phytogenic component, a nutritional component, or a combination thereof. The phytogenic component can include *Quillaja saponaria*, capsaicin, trans-anethole, or a combination thereof.

12 Claims, 8 Drawing Sheets

(51) Int. Cl.
*A23K 20/158* (2016.01)
*A23K 40/30* (2016.01)
*A23K 50/80* (2016.01)
*A61K 31/085* (2006.01)
*A61K 31/165* (2006.01)
*A61K 36/064* (2006.01)
*A61K 36/79* (2006.01)
*A61K 36/81* (2006.01)
*A61P 3/02* (2006.01)

(56) References Cited

OTHER PUBLICATIONS

Delacon Biotechnik GmbH, "Delacon Syrena [Registered], Syrena [Registered] Boost Phytogenic performance for aquaculture", Apr. 2021, 41 pages.
Makol, "Phytogenic solution for L. vannamei performance." From the Internet: https://www.delacon.com/fileadmin/media/image/Tech_Talk/Phytogenic_solution_for_L.vannamei_performance_International_Aquafeed_magazine.pdf. International Aquafeed, Aug. 2021, pp. 32-33.
Palanikumar et al., "Usage of plant natural products for prevention and control of white feces syndrome (WFS) in Pacific whiteleg shrimp Litopenaeus vannamei farming in India." Aquacult Int 28, 113-125 (2020). https://doi.org/10.1007/s10499-019-00448-5.

* cited by examiner

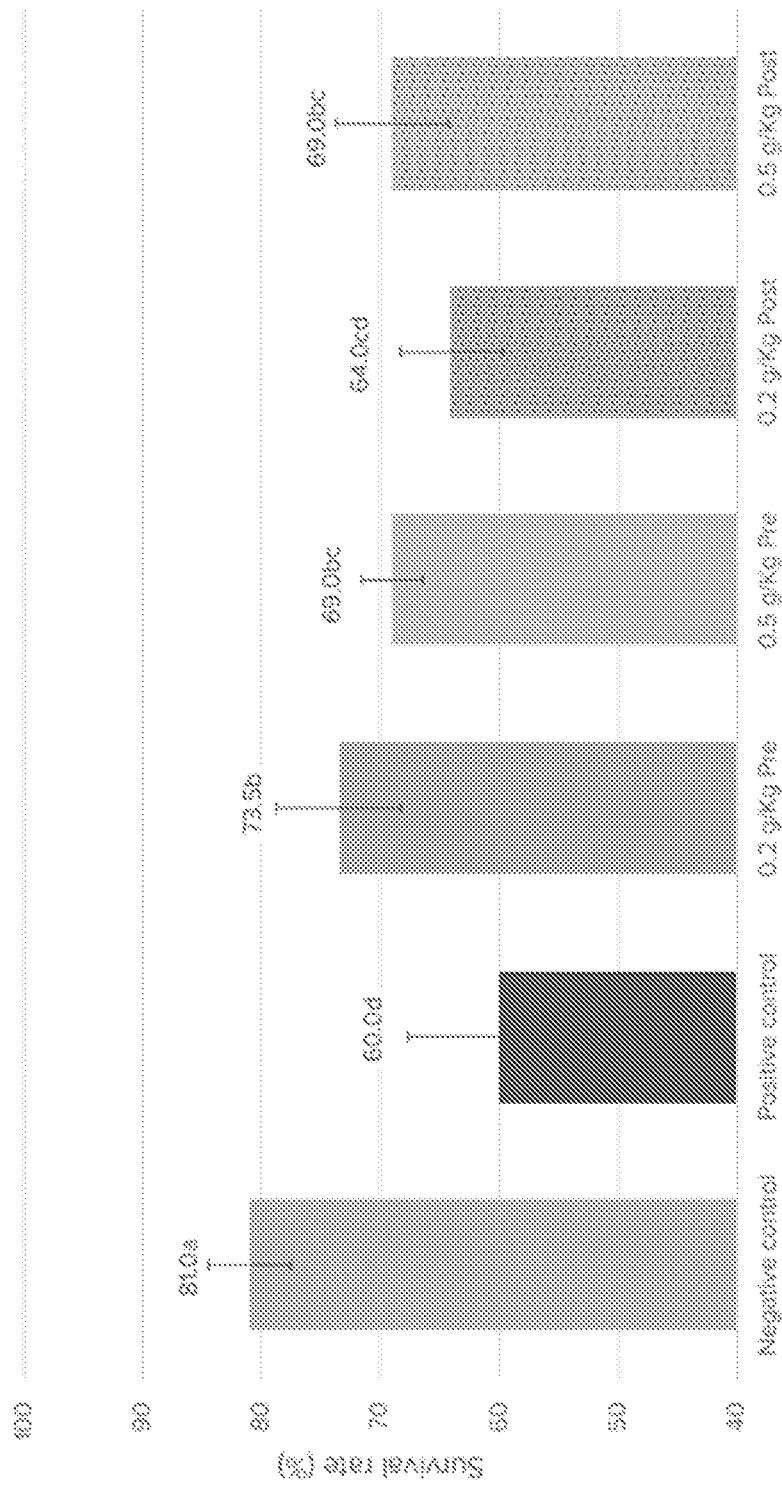
FIG. 2 - Effect on Survival

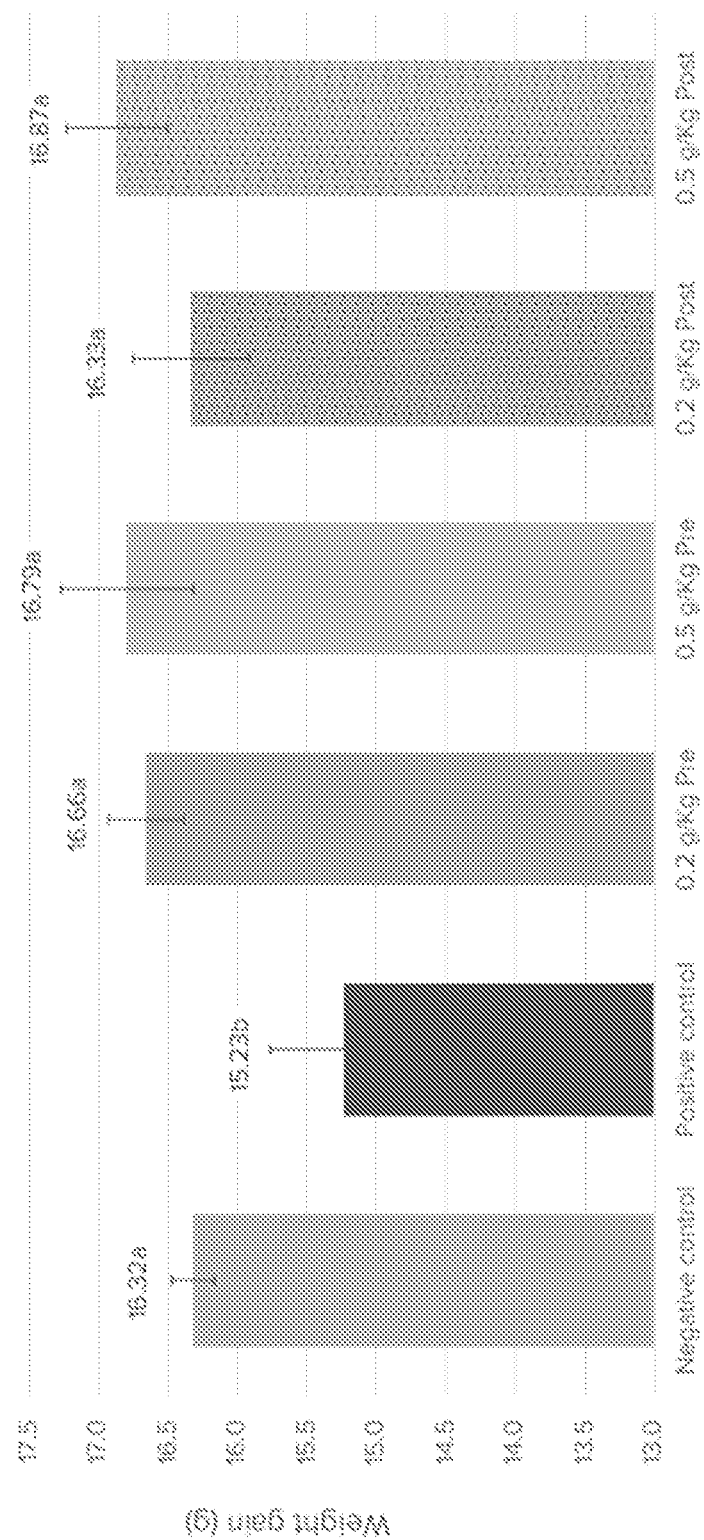
FIG. 3 - Effect on Weight Gain

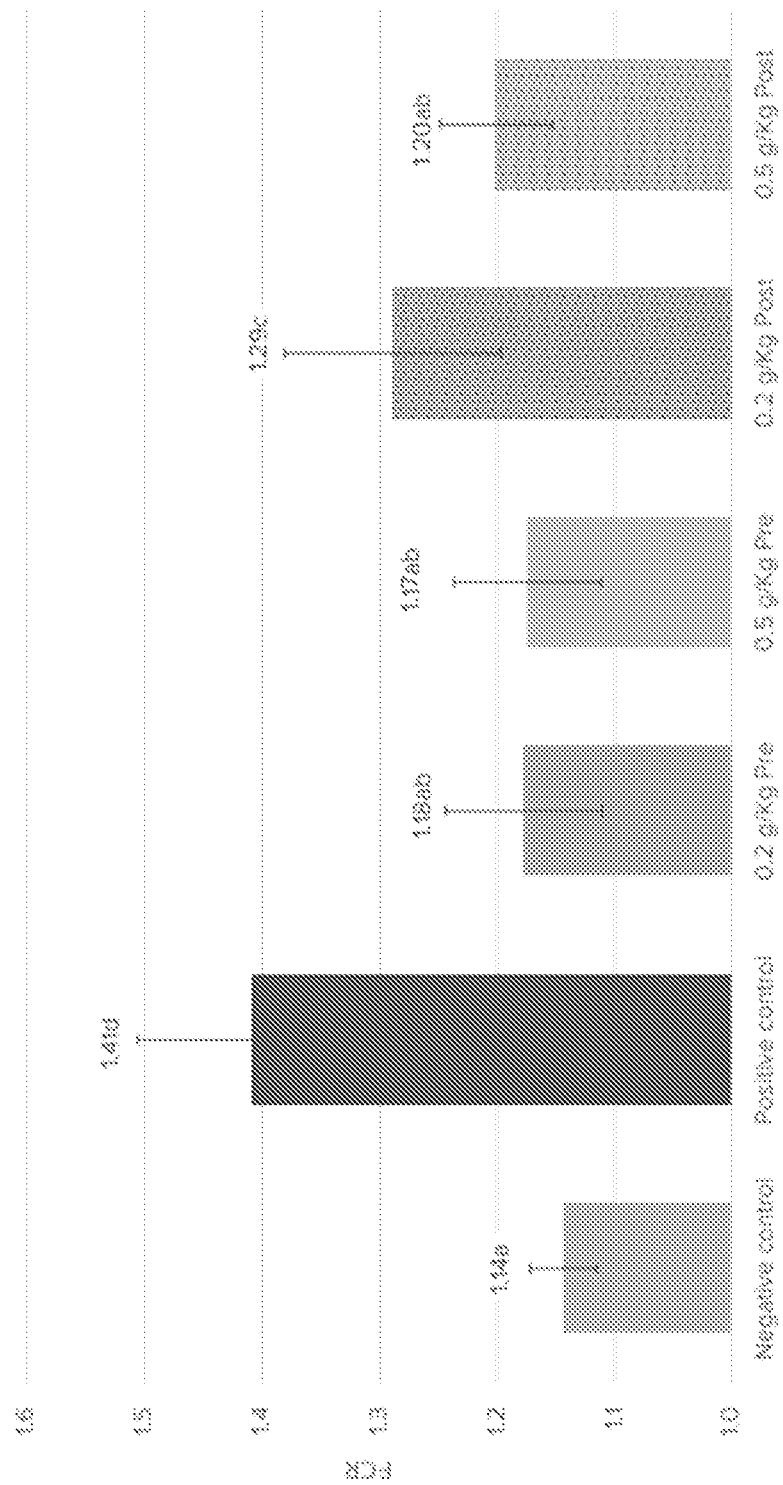
FIG. 4 - Effect on Feed Conversion Rate (FCR)

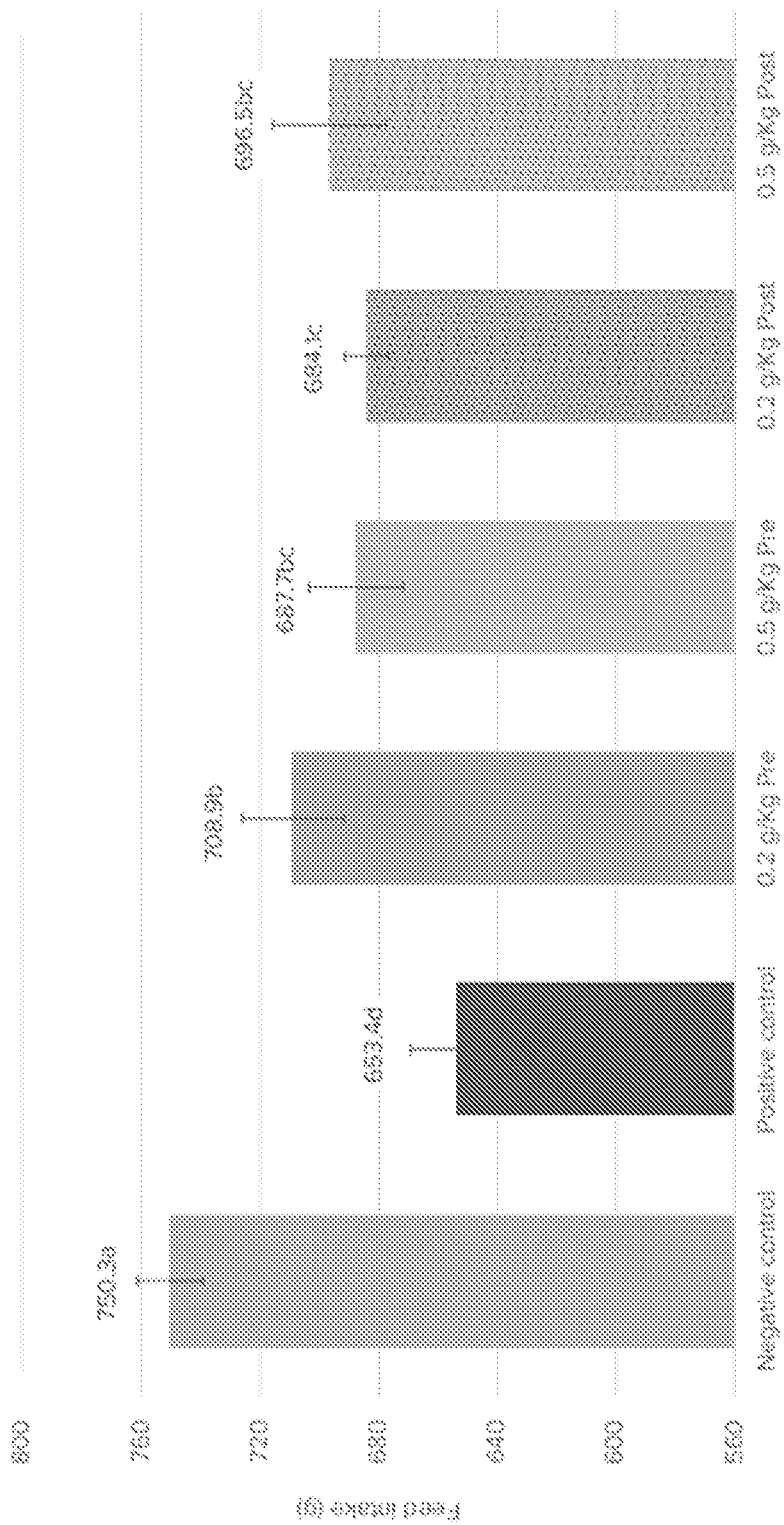
FIG. 5 - Effect on Feed Intake

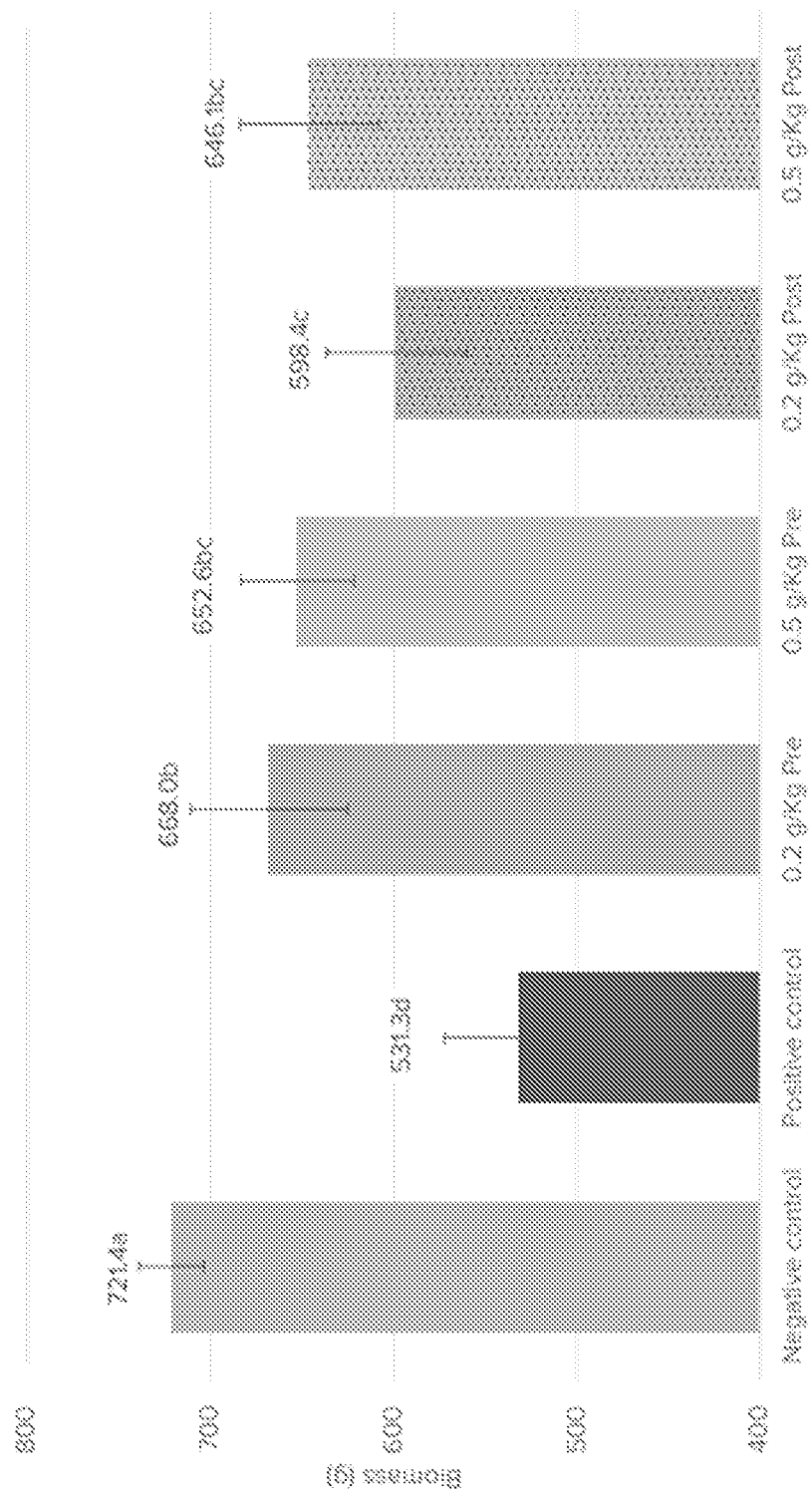
FIG. 6 - Effect on Final Biomass

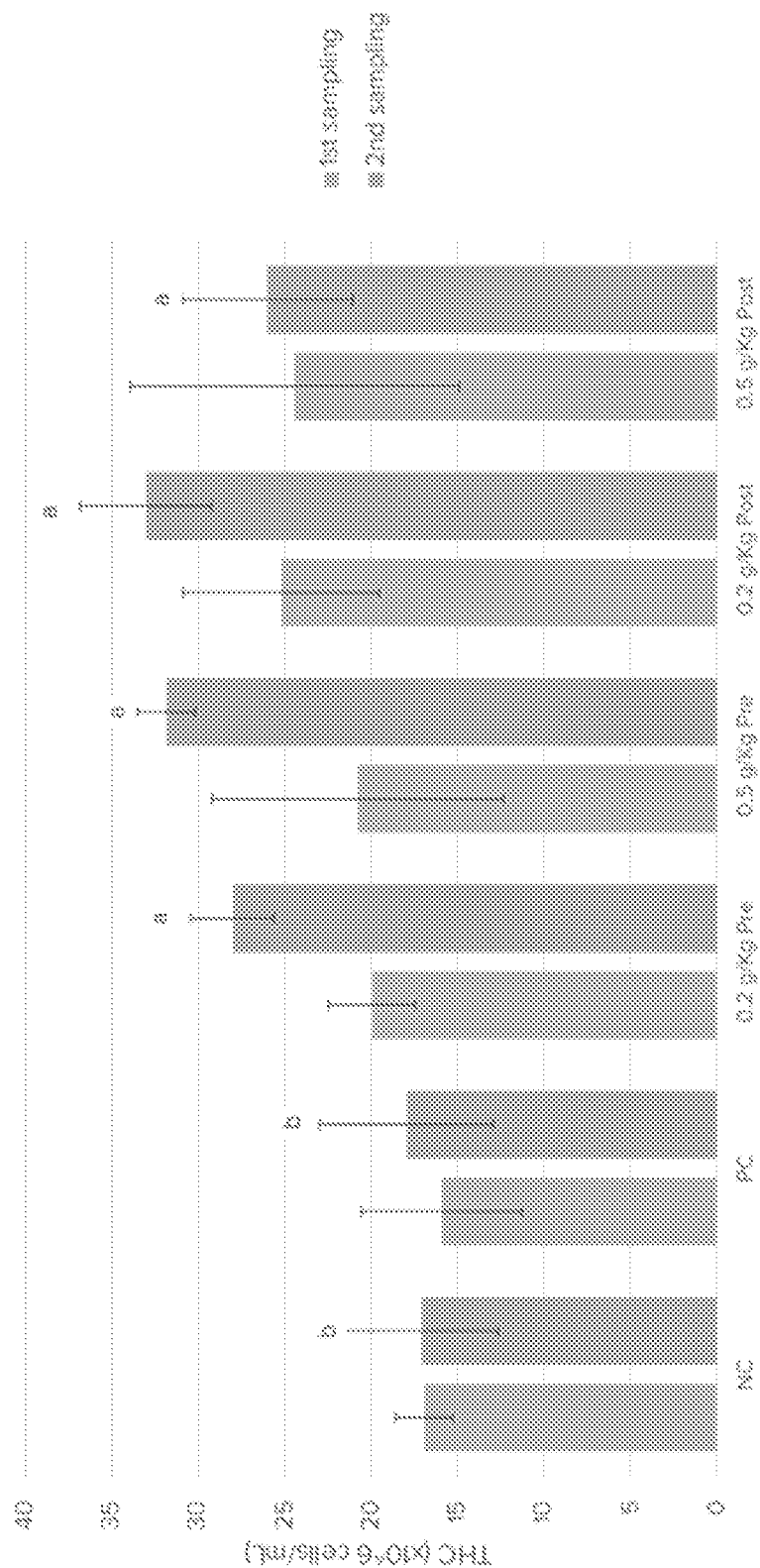
FIG. 7a - Effect on Immune Parameters – Total Hemocytes Count (THC)

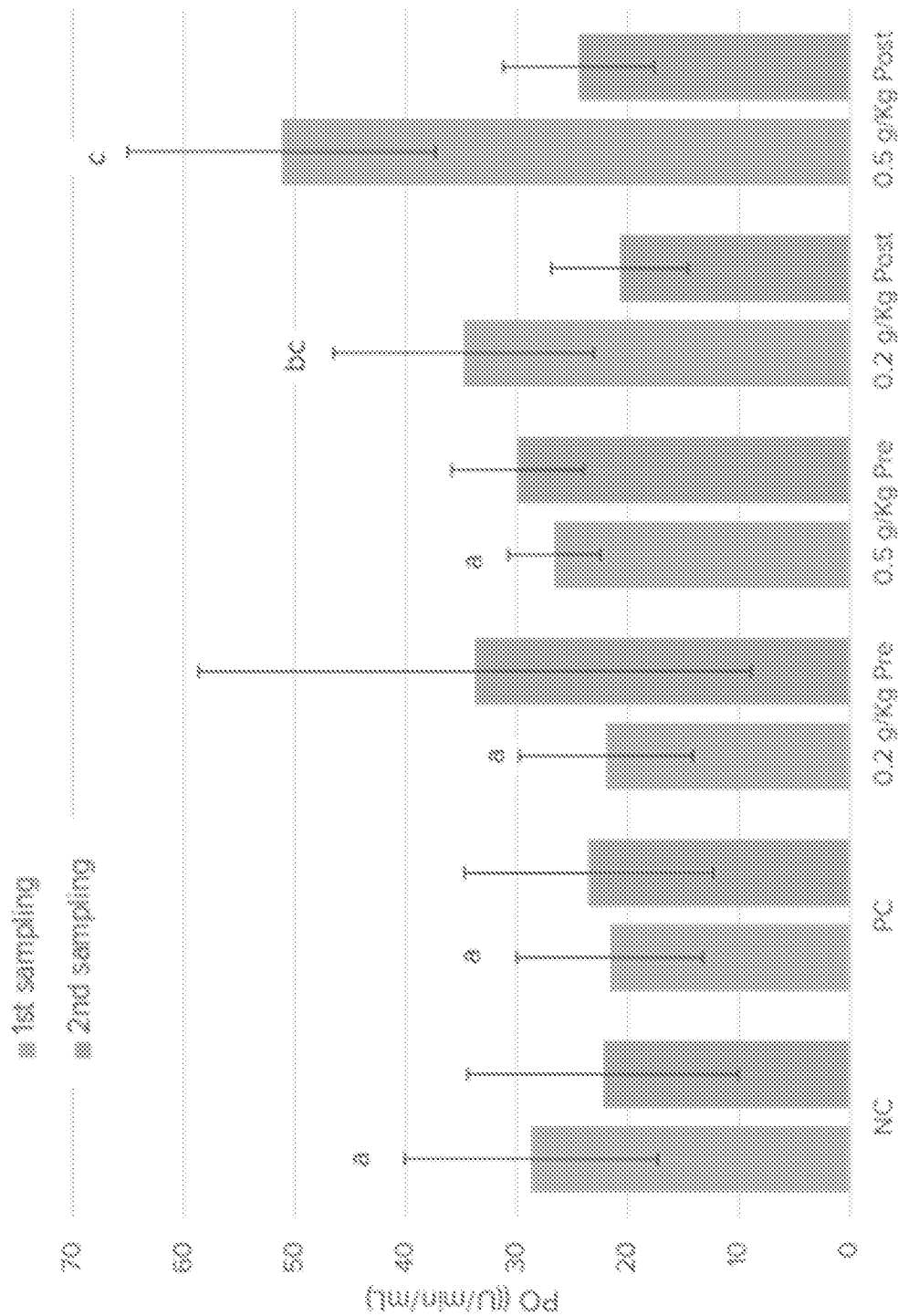
FIG. 7b - Effect on Immune Parameters – Phenoloxidase Activity (PO)

TREATMENT OF WHITE FECES SYNDROME IN SHRIMP

This application is a national phase application of PCT Application No. PCT/US2022/075952, filed Sep. 2, 2022, which claims the benefit of U.S. Provisional Patent Application No. 63/240,200, filed Sep. 2, 2021, each of which is incorporated by reference herein in its entirety.

BACKGROUND

White feces syndrome, also referred to as white feces disease, is endemic in many of the shrimp producing geographies with particular presence in Asia. The syndrome is characterized by the appearance of white fecal strings in the water followed by a rise in mortality. Those shrimp that survive are also noted to have poorer growth, feed intake and feed conversion. The syndrome results in a net reduction in total biomass and higher feed required per unit of gain.

The shrimp industry as a whole has not come up with a significant solution to address white feces syndrome. As a result, white feces syndrome has led to 10-20% mortality industry-wide.

SUMMARY OF THE INVENTION

The present invention provides a shrimp feed additive. The shrimp feed additive includes a phytogenic component that includes a one or more saponins, capsaicinoides, essential oil, or combinations thereof. The one or more saponins include various forms of *Quillaja saponaria* such as a biomass powder or extract, bark powder, and bark extract. Representative examples of the capsaicinoides include capsaicin and cayenne pepper. Both natural and synthetic essential oils are contemplated by the invention and may be provided iTn an encapsulated or non-encapsulated form. Representative examples of essential oils include anethole, star anise, carvacrol, and cinnamaldehyde. When fed to shrimp the shrimp feed additive is effective to prevent, reduce the occurrence of, treat, and/or facilitate recovery from white feces syndrome detrimental effects in the shrimp.

The present invention provides a shrimp feed additive. The shrimp feed additive includes a phytogenic component that includes *Quillaja saponaria*, capsaicin, and trans-anethole. When fed to shrimp the shrimp feed additive is effective to prevent, reduce the occurrence of, treat, and/or facilitate recovery from white feces syndrome in the shrimp.

The present invention provides a shrimp feed additive. The shrimp feed additive includes a nutritional component including one or more vitamins, nutrients, nucleic acids, and/or nucleotides. When fed to shrimp the shrimp feed additive is effective to prevent, reduce the occurrence of, treat, and/or facilitate recovery from white feces syndrome in the shrimp. In various aspects, the shrimp feed additive also includes a phytogenic component.

The present invention provides a shrimp feed additive. The shrimp feed additive includes a phytogenic component including *Quillaja saponaria*, cayenne pepper, and a star anise extract. The *Quillaja saponaria* and the star anise extract may be provided in both non-encapsulated forms and encapsulated forms such as matrix encapsulation and encapsulating shells to protect the materials during processing and storage and provides release of the materials in a shrimp's digestive tract. The shrimp feed additive also includes a nutritional component including one or more vitamins, nutrients, nucleic acids, and/or nucleotides. When fed to shrimp the shrimp feed additive is effective to prevent, reduce the occurrence of, treat, and/or facilitate recovery from white feces syndrome in the shrimp.

The present invention provides a shrimp feed. The shrimp feed includes the shrimp feed additive described herein, and further includes a base feed component. When fed to shrimp, the shrimp feed is effective to prevent, reduce the occurrence of, treat, and/or facilitate recovery from white feces syndrome in the shrimp. In various aspects, the phytogenic component can be 0.001 wt % to 0.2 wt % of the shrimp feed. In other aspects, the phytogenic component can be 0.001 wt % to 0.5 wt % of the shrimp feed. And in still other aspects, the phytogenic component can be 0.2 wt % of the shrimp feed.

The present invention provides a method of making the shrimp additive described herein. The method includes combining a phytogenic component with a nutritional component to form the shrimp feed additive.

The present invention provides a method of making the shrimp feed described herein. The method includes combining the shrimp feed additive of the present invention with a base feed component to form the shrimp feed.

The present invention provides a method of feeding shrimp. The method includes feeding shrimp a feed composition that includes the shrimp feed additive of the present invention. The feed composition can be the shrimp feed of the present invention.

The present invention provides a method of feeding shrimp. The method includes feeding shrimp a feed composition that includes a shrimp feed additive and a base feed component. In one aspect, the shrimp feed additive includes a phytogenic component that is 0.001 wt % to 0.2 wt % of the shrimp feed. In another aspect, the shrimp feed additive includes a phytogenic component that is 0.001 wt % to 0.5 wt % of the shrimp feed. The phytogenic component includes *Quillaja saponaria*, cayenne pepper, and a star anise extract. The *Quillaja saponaria* and the star anise extract may be provided in both non-encapsulated forms and encapsulated forms such as matrix encapsulation and encapsulating shells to protect the materials during processing and storage and provides release of the materials in a shrimp's digestive tract. The shrimp feed additive also includes a nutritional component including one or more vitamins, nutrients, nucleic acids, and/or nucleotides. The method is effective to prevent, reduce the occurrence of, treat, and/or facilitate recovery of white feces syndrome in the shrimp.

The shrimp feed additive of the present invention and methods of using the same have certain advantages over other shrimp feeds and additives therefor. For example, in various aspects of the present invention, when fed to shrimp the shrimp feed additive of the present invention is effective to prevent, reduce the occurrence of, treat, and/or facilitate recovery from white feces syndrome in the shrimp to a greater extent than other shrimp feed additives or shrimp feeds. In various aspects, the shrimp feed additive helps the shrimp combat the syndrome and reduce mortality while speeding the repair of the gastro-intestinal tract to recover intake and gain more body weight quickly and reduce the negative impact on total biomass production as well as the efficiency of conversion. In various aspects of the present invention, phytogenics in the shrimp feed additive can have an antimicrobial effect on the causative agent of white feces syndrome, can reduce biofilm formation, can enhance the intake and digestion of the shrimp, can accelerate repair and recovery, or a combination thereof. In various aspects of the present invention, nutrients in the shrimp feed additive can aid in recovery from white feces syndrome.

BRIEF DESCRIPTION OF THE FIGURES

The drawings illustrate generally, by way of example, but not by way of limitation, various aspects of the present invention.

FIG. 2 illustrates survival rates of shrimp, in accordance with various aspects.

FIG. 3 illustrates effect on weight gain, in accordance with various aspects.

FIG. 4 illustrates effect on feed conversion ratio (FCR) at trial termination, in accordance with various aspects.

FIG. 5 illustrates effect on feed intake, in accordance with various aspects.

FIG. 6 illustrates effect on final biomass at trial termination, in accordance with various aspects.

FIGS. 7(a-b) illustrates effect on immune parameters, in accordance with various aspects.

DETAILED DESCRIPTION OF THE INVENTION

Figure 1:
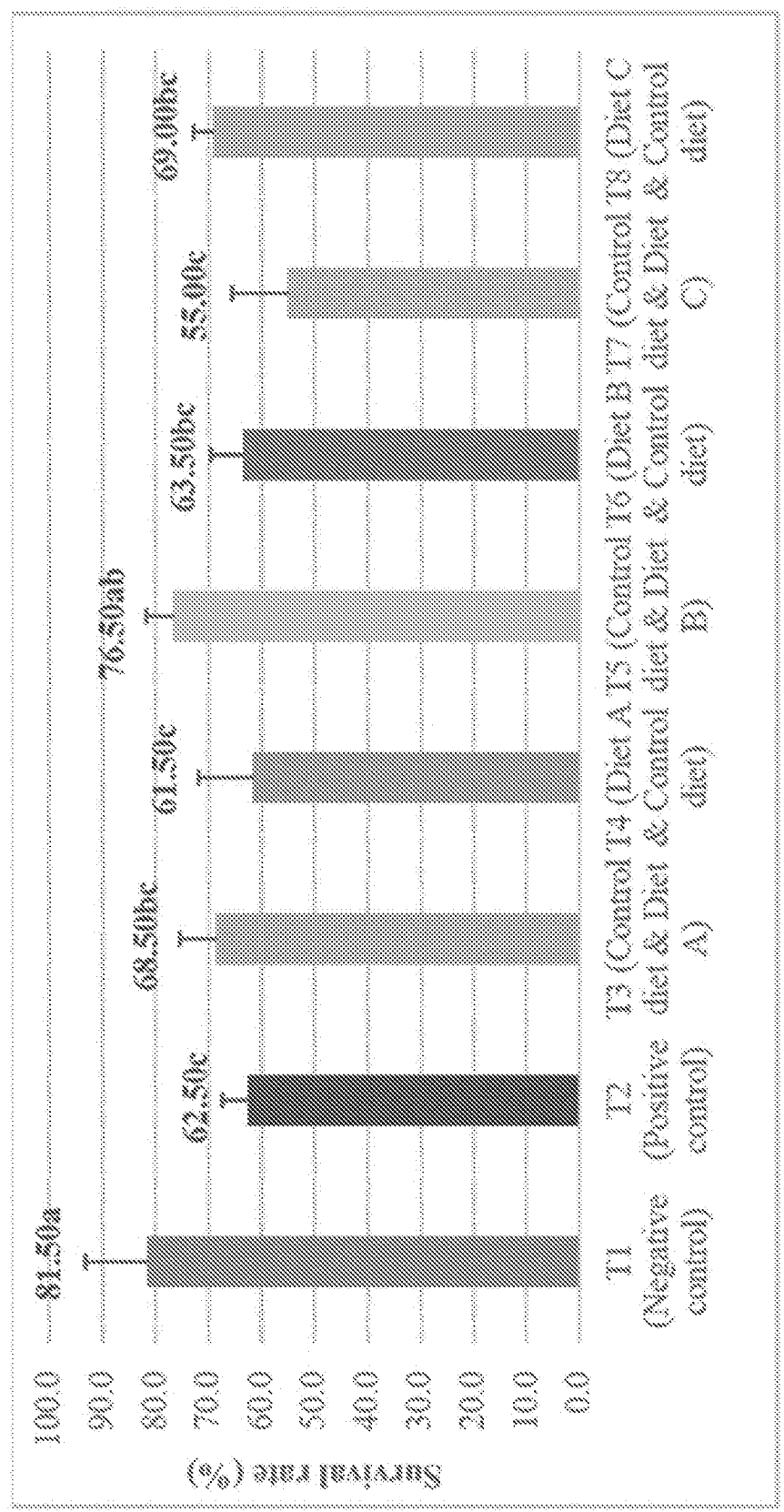
FIG. 1 illustrates survival rates of shrimp, in accordance with various aspects.

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0) wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Shrimp Feed Additive.

Various aspects of the present invention provide a shrimp feed additive. When fed to shrimp (e.g., as a component of a shrimp feed composition), the shrimp feed additive is effective to prevent, reduce the occurrence of, treat, and/or facilitate recovery from white feces syndrome in the shrimp.

The shrimp feed additive can include a phytogenic component. The shrimp feed additive includes a phytogenic component that includes a one or more saponins, capsaicinoides, essential oil, or combinations thereof. The one or more saponins include various forms of *Quillaja saponaria* such as a biomass powder or extract, bark powder, and bark extract. Representative examples of the capsaicinoides include capsaicin and cayenne pepper. Both natural and synthetic essential oils are contemplated by the invention and may be provided in an encapsulated or non-encapsulated form. Representative examples of essential oils include anethole, star anise, carvacrol, and cinnamaldehyde. In various aspects the phytogenic component includes *Quillaja saponaria*; capsaicin; and trans-anethole.

The phytogenic component can be any suitable proportion of the shrimp feed additive. The phytogenic component can be 0.01 wt % to 100 wt % of the shrimp feed additive, or 0.01 wt % to 99.99 wt %, or 0.15 wt % to 15 wt %, or less than, equal to, or greater than 0.01 wt %, 0.05, 0.1, 0.2, 0.4, 0.6, 0.8, 1, 1.2, 1.3, 1.4, 1.5, 1.6, 1.7, 1.8, 2, 2.5, 3, 3.5, 4, 4.5, 5, 6, 8, 10, 12, 14, 16, 18, 20, 25, 30, 35, 40, 45, 50, 60, 70, 80, 90, or 95 wt % of the shrimp feed additive.

The phytogenic component can include one compound or more than one compound. The phytogenic component can include a flavonoid, a tannin, a saponin, a mucilage, a bitter substance, an essential oil, a pungent substance, or a combination thereof. The phytogenic component can include cayenne pepper, ginger, onion, elderflower, citrus, grape, chestnut, oak, tea, *ginseng, yucca, quillaja*, fenugreek, linseed, chamomile, gentian, dandelion, hops, caraway, star anise, thyme, garlic, cinnamon, oregano, tea tree, *eucalyptus*, green tea, an extract thereof, or a combination thereof. The phytogenic additive can include cinnamon, a fermentation metabolite product from yeast, or a combination thereof.

One or more essential oils and/or extracts thereof in the phytogenic component can include encapsulated oil particles and non-encapsulated oil particles, wherein an encapsulating shell or matrix encapsulates the essential oil and/or extract thereof. The encapsulating shell or matrix can protect the essential oil or extract during processing and storage and can provide release of the essential oil or extract in a shrimp's digestive tract. The encapsulating shell or matrix can include any suitable material that can protect the essential oil or extract thereof until reaching a shrimp's digestive tract. The encapsulating shell can include a modified starch, protein, or a combination thereof.

The capsaicinoide can form any suitable proportion of the phytogenic component. For example, the capsaicinoide can be 0.001 wt % to 100 wt % of the phytogenic component, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. The capsaicinoide can form any suitable proportion of the shrimp feed additive, such as 0.001 wt % to 100 wt % of the shrimp feed additive, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. The capsaicinoide can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %.

The capsaicinoide can be provided by any suitable capsaicinoide source, including capsaicin and cayenne pepper. In various aspects, the capsaicinoide is provided by cayenne pepper. Cayenne pepper can form any suitable proportion of the phytogenic component. For example, cayenne pepper can be 0.001 wt % to 100 wt % of the phytogenic component, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Cayenne pepper can form any suitable proportion of the shrimp feed additive, such as 0.001 wt % to 100 wt % of the shrimp feed additive, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Cayenne pepper can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %.

The essential oil can be provided by any suitable essential oil source, including both synthetic and natural sources. In various aspects, the essential oil source is trans-anethole, trans-anethole can form any suitable proportion of the phytogenic component. For example, trans-anethole can be 0.001 wt % to 100 wt % of the phytogenic component, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Trans-anethole can form any suitable proportion of the shrimp feed additive, such as 0.001 wt % to 100 wt % of the shrimp feed additive, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Trans-anethole can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %.

The trans-anethole can be provided by any suitable source of trans-anethole, such as by an extract of star anise, anise, fennel, anise myrtle, liquorice, *magnolia* blossoms, or a combination thereof. For example, in various aspects, the trans-anethole is provided by star anise extract. Star anise extract can form any suitable proportion of the phytogenic component. For example, star anise extract can be 0.001 wt % to 100 wt % of the phytogenic component, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Star anise extract can form any suitable proportion of the shrimp feed additive, such as 0.001 wt % to 100 wt % of the shrimp feed additive, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. Star anise extract can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %. In various aspects, the star anise extract can be encapsulated star anise extract particles including an encapsulating matrix or shell that can protect the extract during processing and storage and can provide release of the extract in a shrimp's digestive tract.

The saponin can form any suitable proportion of the phytogenic component. For example, in one aspect the saponin is a *Quillaja saponaria* provided in various forms including as a biomass powder or extract and can be 0.001 wt % to 100 wt % of the phytogenic component, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. The *Quillaja saponaria* can form any suitable proportion of the shrimp feed additive, such as 0.001 wt % to 100 wt % of the shrimp feed additive, or 0.001 wt % to 99.999 wt %, or less than, equal to, or greater than 0.001 wt %, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 95, 96, 97, 98, 99, 99.9, 99.99, or 99.999 wt %. The *Quillaja saponaria* can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %. In various aspects, the *Quillaja saponaria* can be encapsulated including by means of an encapsulating matrix or shell that can protect the *Quillaja saponaria* during processing and storage and can provide release of the *Quillaja saponaria* in a shrimp's digestive tract.

The phytogenic component can include a fermentation metabolite product from yeast. The fermentation metabolite product from yeast can form any suitable proportion of the shrimp feed additive, such as 0.4 wt % to 80 wt % of the shrimp feed additive, or 30 wt % to 60 wt %, or less than or equal to 80 wt % and greater than or equal to 0.01 wt %, 0.05, 0.1, 0.5, 1, 2, 5, 10, 15, 20, 25, 30, 32, 34, 36, 38, 40, 42, 44, 46, 48, 50, 55, 60, 65, 70, or 75 wt %. The fermentation metabolite product from yeast can form any suitable proportion of a shrimp feed composition that includes the shrimp feed additive, such as 0.005 wt % to 5 wt %, or 0.05 wt % to 1 wt %, or less than or equal to 5 wt % and greater than or equal to 0.005 wt %, 0.01, 0.05, 0.1, 0.2, 0.3, 0.4, 0.5, 0.6, 0.7, 0.8, 0.9, 1, 1.5, 2, 2.5, 3, 3.5, 4, or 4.5 wt %.

The phytogenic component can include a *yucca* extract. The *yucca* extract can form any suitable proportion of the shrimp feed additive, such as 0.04 wt % to 40 wt % of the shrimp feed additive, or 0.4 wt % to 8 wt %, or less than or equal to 40 wt % and greater than or equal to 0.04 wt %, 0.4, 1, 2, 3, 4, 5, 6, 7, 8, 9, 10, 12, 14, 16, 18, 20, 25, 30, or 35 wt %. The *yucca* extract can form any suitable proportion of a shrimp feed composition that includes the shrimp feed additive, such as 0.0005 wt % to 0.5 wt %, or 0.005 wt % to 0.1 wt %, or less than or equal to 0.5 wt % and greater than or equal to 0.0005 wt %, 0.001, 0.005, 0.01, 0.02, 0.03, 0.04, 0.05, 0.06, 0.07, 0.08, 0.09, 0.1, 0.15, 0.2, 0.25, 0.3, 0.35, 0.4, or 0.45 wt %.

In various aspects, the shrimp feed additive can include a nutritional component. The shrimp feed additive can include the phytogenic component and the nutritional component, the phytogenic component without the nutritional component, or the nutritional component without the phytogenic component. The nutritional component can include one or more vitamins, nutrients, nucleic acids, and/or nucleotides. The nutritional component can form any suitable proportion of the shrimp feed additive, such as 0.01 wt % to 100 wt %, or 0.4 wt % to 80 wt %, or 4 wt % to 60 wt %, or less than, equal to, or greater than 0.01 wt %, 0.05, 0.1, 0.5, 1, 2, 4, 6, 8, 10, 15, 20, 25, 30, 35, 40, 45, 50, 55, 60, 65, 70, 75, 80, 85, 90, 92, 94, 96, 98, 99, 99.9, or 99.99 wt %. The nutritional component can form any suitable proportion of a shrimp feed composition that includes the shrimp feed additive, such as 0.0001 wt % to 0.5 wt % of the shrimp feed composition, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %.

The nutritional component can include vitamin C. The vitamin C can be any suitable proportion of the shrimp feed additive, such as 0.001 wt % to 3 wt %, or 0.05 wt % to 0.5 wt %, or less than or equal to 3 wt % and greater than or equal to 0.001 wt %, 0.005, 0.01, 0.05, 0.1, 0.2, 0.3, 0.4, 0.6, 0.8, 1, 1.5, 2, or 2.5 wt %. Vitamin C can form any suitable proportion of a shrimp feed composition that includes the shrimp feed additive (e.g., vitamin C from the nutritional component alone, or vitamin C from a combination of the nutritional component and the base feed in the shrimp feed composition), such as 0.0001 wt % to 2 wt %, or 0.0003 wt % to 0.3 wt %, or less than or equal to 2 wt % and greater than or equal to 0.0001 wt %, 0.0005, 0.001, 0.002, 0.003, 0.004, 0.005, 0.006, 0.007, 0.008, 0.01, 0.05, 0.1, 0.2, 0.3, 0.4, 0.5, 0.6, 0.7, 0.8, 0.9, 1, 1.2, 1.4, 1.6, or 1.8 wt %.

The nutritional component can include vitamin E. The vitamin E can be any suitable proportion of the shrimp feed additive, such as 0.001 wt % to 1.5 wt % of the shrimp feed additive, or 0.01 wt % to 0.3 wt %, or less than or equal to 1.5 wt % and greater than or equal to 0.001 wt %, 0.005, 0.01, 0.02, 0.04, 0.06, 0.08, 0.09, 0.1, 0.11, 0.12, 0.13, 0.14, 0.15, 0.16, 0.18, 0.2, 0.25, 0.3, 0.4, 0.6, 0.8, 1, 1.2, or 1.4 wt %. Vitamin E can form any suitable proportion of a shrimp feed composition that includes the shrimp feed additive (e.g., vitamin E from the nutritional component alone, or vitamin E from a combination of the nutritional component and the base feed in the shrimp feed composition), such as 0.0001 wt % to 4 wt %, or 0.0002 wt % to 0.8 wt %, or less than or equal to 4 wt % and greater than or equal to 0.0001 wt %, 0.0005, 0.001, 0.002, 0.003, 0.004, 0.005, 0.006, 0.008, 0.01, 0.05, 0.1, 0.2, 0.3, 0.4, 0.5, 0.6, 0.7, 0.8, 0.9, 1, 1.5, 2, 2.5, 3, or 3.5 wt %.

The nutritional component can include one or more nucleotides. The one or more nucleotides can form any suitable proportion of the shrimp feed additive, such as 0.2 wt % to 80 wt % of the shrimp feed additive, or 10 wt % to 20 wt %, or less than or equal to 80 wt % and greater than or equal to 0.2 wt %, 0.5, 1, 2, 4, 6, 8, 10, 11, 12, 13, 14, 15, 16, 17, 18, 19, 20, 22, 24, 26, 28, 30, 35, 40, 45, 50, 55, 60, 65, 70, or 75 wt %. The one or more nucleotides can form any suitable proportion of a shrimp feed composition that includes the shrimp feed additive, such as 0.002 wt % to 2 wt %, or 0.02 wt % to 0.4 wt %, or less than or equal to 2 wt % and greater than or equal to 0.002 wt %, 0.01, 0.05, 0.1, 0.15, 0.2, 0.25, 0.3, 0.4, 0.6, 0.8, 1, 1.2, 1.4, 1.6, or 1.8 wt %.

The nutritional component can include cell contents and/or cell walls of brewer's yeast. The cell contents and/or cell walls of brewer's yeast can form any suitable proportion of the shrimp feed additive, such as 0.2 wt % to 80 wt % of the shrimp feed additive, or 10 wt % to 20 wt %, or less than or equal to 80 wt % and greater than or equal to 0.2 wt %, 1, 2, 4, 6, 8, 10, 11, 12, 13, 14, 15, 16, 17, 18, 19, 20, 22, 24, 26, 28, 30, 35, 40, 45, 50, 55, 60, 65, 70, or 75 wt %. The cell contents and/or cell walls of brewer's yeast can form any suitable proportion of a shrimp feed composition that includes the shrimp feed additive, such as 0.002 wt % to 2 wt %, or 0.02 wt % to 0.4 wt %, or less than or equal to 2 wt % and greater than or equal to 0.002 wt %, 0.01, 0.05, 0.1, 0.15, 0.2, 0.25, 0.3, 0.4, 0.6, 0.8, 1, 1.2, 1.4, 1.6, or 1.8 wt %.

The nutritional component can include threonine. The threonine can form any suitable proportion of the shrimp feed additive, such as 0.2 wt % to 80 wt % of the shrimp feed additive, or 15 wt % to 25 wt %, or less than or equal to 80 wt % and greater than or equal to 0.2 wt %, 0.5, 1, 2, 4, 6, 8, 10, 12, 14, 16, 17, 18, 19, 20, 21, 22, 23, 24, 25, 26, 28, 30, 35, 40, 45, 50, 55, 60, 65, 70, or 75 wt %. The threonine can form any suitable proportion of a shrimp feed composition that includes the shrimp feed additive, such as 0.003 wt % to 6 wt %, or 0.03 wt % to 1 wt %, or less than or equal to 6 wt % and greater than or equal to 0.003 wt %, 0.01, 0.05, 0.1, 0.15, 0.2, 0.25, 0.3, 0.4, 0.5, 0.6, 0.8, 1, 1.2, 1.4, 1.6, 1.8, 2, 2.5, 3, 3.5, 4, 4.5, or 5 wt %.

The nutritional component can include tryptophan. The tryptophan can form any suitable proportion of the shrimp feed additive, such as 0.03 wt % to 30 wt % of the shrimp feed additive, or 1 wt % to 5 wt %, or less than or equal to 30 wt % and greater than or equal to 0.03 wt %, 0.1, 0.5, 1, 1.5, 2, 2.5, 3, 3.5, 4, 4.5, 5, 5.5, 6, 7, 8, 9, 10, 12, 14, 16, 18, 20, 22, 24, 26, or 28 wt %. The tryptophan can form any suitable proportion of a shrimp feed composition that includes the shrimp feed additive, such as 0.0001 wt % to 0.4 wt %, or 0.004 wt % to 0.07 wt %, or less than or equal to 0.4 wt % and greater than or equal to 0.0001 wt %, 0.0005, 0.001, 0.005, 0.01, 0.02, 0.025, 0.03, 0.035, 0.04, 0.05, 0.06, 0.08, 0.1, 0.15, 0.2, 0.25, 0.3, or 0.35 wt %.

The nutritional component can include glucuronolactone. The glucuronolactone can form any suitable proportion of the shrimp feed additive, such as 0.2 wt % to 80 wt % of the shrimp feed additive, or 10 wt % to 20 wt %, or less than or equal to 80 wt % and greater than or equal to 0.2 wt %, 1, 2, 4, 6, 8, 10, 11, 12, 13, 14, 15, 16, 17, 18, 19, 20, 22, 24, 26, 28, 30, 35, 40, 45, 50, 55, 60, 65, 70, or 75 wt %. The glucuronolactone can form any suitable proportion of a shrimp feed composition that includes the shrimp feed additive, such as 0.002 wt % to 2 wt %, or 0.02 wt % to 0.4 wt %, or less than or equal to 2 wt % and greater than or equal to 0.002 wt %, 0.01, 0.05, 0.1, 0.15, 0.2, 0.25, 0.3, 0.4, 0.6, 0.8, 1, 1.2, 1.4, 1.6, or 1.8 wt %.

When fed to shrimp (e.g., following the method of feeding shrimp described herein), the shrimp feed additive (e.g., when fed to shrimp in a shrimp feed composition that includes a base feed and the shrimp feed additive) is effective to prevent, reduce the occurrence of, treat, and/or facilitate recovery from white feces syndrome in any suitable shrimp, such as any shrimp described herein. In various aspects, the shrimp feed additive effective to prevent, reduce the occurrence of, treat, and/or facilitate recovery from white feces syndrome in a shrimp that is *P. vannamei*. When fed to shrimp, the shrimp feed additive can be effective to prevent or reduce the occurrence of white feces syndrome in the shrimp. When fed to shrimp, the shrimp feed additive can be effective to treat white feces syndrome in the shrimp. When fed to shrimp, the shrimp feed additive can be effective to facilitate recovery from white feces syndrome in the shrimp. When fed to shrimp, the shrimp feed additive can be effective to prevent or reduce the occurrence of, treat, and facilitate recovery from white feces syndrome in the shrimp.

Shrimp Feed.

In various aspects, the present invention provides a shrimp feed. The shrimp feed includes the shrimp feed additive of the present invention and a base feed component. The shrimp feed additive can include the phytogenic component, the nutritional component, or a combination thereof.

The base feed can be any suitable base feed. The base feed can be an aquafeed, such as a manufactured or artificial diet to supplement or to replace natural feeds in the aquaculture industry (e.g., the shrimp industry). These prepared feeds are most commonly produced in flake, pellet, or tablet form. The base feed is composed of several ingredients in various proportions complementing each other to form a nutritionally complete diet for the shrimp.

The base feed can include one or more proteins, carbohydrates, fats, fibers, vitamins, minerals, phosphorus sources, or a combination thereof. The base feed can include wheat, wheat flour, soy bean meal, fish meal, fish oil, vegetable oil (e.g., from soy beans, rapeseeds, sunflower seeds, or flax seeds), cottonseed meal, peanut meal, canola meal, distillers grain with solubles, legume meal, binder attractant, additives, toxin absorbers, or a combination thereof. Additives can include enzymes, growth promoters, heath additives, or a combination thereof. Health additives can include immunostimulants, probiotics, vaccines, or a combination thereof.

The shrimp feed additive can form any suitable proportion of the shrimp feed. For example, the shrimp feed additive can be 0.01 wt % to 50 wt % of the shrimp feed, or 0.1 wt % to 15 wt %, or 1 wt % to 2 wt % of the shrimp feed, or less than or equal to 50 wt % and greater than or equal to 0.01 wt %, 0.05, 0.1, 0.2, 0.4, 0.6, 0.8, 1, 1.2, 1.3, 1.4, 1.5, 1.6, 1.7, 1.8, 1.9, 2, 2.5, 3, 3.5, 4, 4.5, 5, 6, 8, 10, 12, 14, 16, 18, 20, 25, 30, 35, 40, or 45 wt %.

The base feed component can form any suitable proportion of the shrimp feed. For example, the base feed component can be 50 wt % to 99.99 wt % of the shrimp feed, or 85 wt % to 99.9 wt %, or 98 wt % to 99 wt %, or less than or equal to 99.99 wt % and greater than or equal to 50 wt %, 55, 60, 65, 70, 75, 80, 85, 90, 91, 92, 93, 94, 95, 96, 97, 98, 98.2, 98.4, 98.6, 98.8, 99, 99.2, 99.4, 99.6, 99.8, 99, or 99.9 wt % of the shrimp feed.

The phytogenic component can form any suitable proportion of the shrimp feed. For example, the phytogenic component can be 0.0001 wt % to 0.5 wt % of the shrimp feed, 0.0001 wt % to 0.2 wt %, 0.002 wt % to 0.04 wt %, or less than or equal to 0.5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, or 0.45 wt %.

The nutritional component can form any suitable proportion of the shrimp feed. For example, the nutritional component can be 0.0001 wt % to 5 wt % of the shrimp feed, or 0.0005 wt % to 5 wt %, or 0.0001 wt % to 1 wt %, or 0.05 wt % to 1 wt %, or 0.0001 wt % to 0.2 wt %, 0.002 wt % to 0.04 wt %, or less than or equal to 5 wt % and greater than or equal to 0.0001 wt %, 0.0005, 0.001, 0.005, 0.01, 0.02, 0.03, 0.04, 0.05, 0.06, 0.08, 0.1, 0.12, 0.14, 0.16, 0.18, 0.2, 0.25, 0.3, 0.35, 0.4, 0.45, 0.5, 0.55, 0.6, 0.8, 1, 1.2, 1.4, 1.6, 1.8, 2, 2.5, 3, 3.5, 4, or 4.5 wt %.

The shrimp feed can have any physical form suitable for feeding shrimp. For example, the shrimp feed can have the form of a flake, tablet, pellet, or a combination thereof.

Method of Making a Shrimp Feed Additive or Shrimp Feed.

In various aspects, the present invention provides a method of making a shrimp feed additive or shrimp feed. The method can be any suitable method that generates the shrimp feed additive or shrimp feed described herein, such that when fed to shrimp the shrimp feed additive or shrimp feed is effective to prevent, reduce the occurrence of, treat, and/or facilitate recovery from white feces syndrome in the shrimp.

The method of making the shrimp feed additive can include combining the phytogenic component with one or more other components to form the shrimp feed additive. The method of making the shrimp feed additive can include combining the nutritional component with one or more other components to form the shrimp feed additive. The method of making the shrimp feed additive can include combining the phytogenic component with a nutritional component to form the shrimp feed additive.

The method of making the shrimp feed can include combining the shrimp feed additive of the present invention with a base feed component to form the shrimp feed.

The combining can be performed in any suitable way, such as using a mixing device. The method of forming the shrimp feed can further include extruding the shrimp feed, and optionally drying and/or breaking the extruded feed into smaller pieces, such as pellets or other suitable shapes for shrimp feed.

Method of Feeding Shrimp.

In various aspects, the present invention provides a method of feeding shrimp. The method can be any suitable method of feeding the shrimp feed additive or shrimp feed described herein to shrimp. The method can be effective to prevent, reduce the occurrence of, treat, and/or facilitate recovery from white feces syndrome in the shrimp. The method includes feeding shrimp a feed composition that includes the shrimp feed additive described herein. The feed composition can be the shrimp feed of the present invention.

The method can include feeding the shrimp any suitable amount of the feed composition, and with any suitable frequency. For example, the method can include offering the shrimp as much of the feed composition as they desire to each. The method can include offering the shrimp the feed composition 1 to 10 times per day, or 3 to 7 times per day, or less than, equal to, or greater than 1 time per day, 2 times per day, 3, 4, 5, 6, 7, 8, 9, or 10 times per day.

The method can result in a higher survival rate of the shrimp as compared to shrimp not fed the feed composition, such as compared to shrimp fed the same feed composition but lacking the shrimp feed additive, lacking the phytogenic component, lacking the nutritional component, or a combination thereof. The method can result in a higher average daily gain, a higher specific growth rate, a higher weight gain, better feed conversion ratio, or a combination thereof, as compared to shrimp not fed the feed composition. The method can be effective to prevent or reduce the occurrence of white feces syndrome in the shrimp.

In some aspects, at least some of the shrimp fed the feed composition have white feces syndrome. In other aspects, none of the shrimp fed the feed composition have white feces syndrome and the method is focused on prevention of white feces syndrome.

In aspects wherein at least some of the shrimp fed the feed composition have white feces syndrome, the method can be effective to treat the white feces syndrome in the shrimp. The method can be effective to facilitate recovery of the shrimp having white feces syndrome. The method can result in a higher survival rate of the shrimp having white feces syndrome as compared to shrimp having white feces syndrome that are not fed the feed composition. The method can result in a higher average daily gain of the shrimp having white feces syndrome as compared to shrimp having white feces syndrome that are not fed the feed composition. The method can result in a higher specific growth rate of the shrimp having white feces syndrome as compared to shrimp having white feces syndrome that are not fed the feed composition. The method can result in a higher feed conversion ratio of the shrimp having white feces syndrome as compared to shrimp having white feces syndrome that are not fed the feed composition.

EXAMPLES

Various aspects of the present invention can be better understood by reference to the following Examples which are offered by way of illustration. The present invention is not limited to the Examples given herein.

The phytogenic blend included a *Quillaja saponaria* biomass powder, capsaicin, and trans-anethole. The phytogenic blend is available from Delacon as Syrena Boost®.

DV Aqua product is a fermentation metabolite product from yeast available from Diamond V.

Example 1

Three different prototype shrimp feed additives A-C were made having the composition shown in Table 1. The added threonine and added tryptophan weight percentages describe the increase in wt % of these components in the base feed caused by adding the prototype composition thereto. Additives A-C were combined with a base feed to generate three different shrimp feeds. A control feed was also used, which was the base feed with nothing added. Each feed was thoroughly mixed/added with all feed ingredients before being moisturized (35-40%) and extruded by a pressurized meat grinder. The extruded feed came out like spaghetti, and was then dried at 50° C. for 6 hours. The final moisture of the feed did not exceed 10.5%. The feed was crushed to the a size of 1.5-2 mm in length and used for the trial. The composition of the four diets is shown in Table 2.

TABLE 1

Prototype compositions.

| Additive | Prototype A - Base Level | kg/T | Prototype B - Base + Phytogenic blend Level | kg/T | Prototype C - Base + DV Aqua Level | kg/T |
| --- | --- | --- | --- | --- | --- | --- |
| DV Aqua | NA | | NA | | NA | 5 |
| Phytogenic blend | NA | | NA | 0.2 | NA | |
| Vitamin C - 35% | +100 ppm | 0.03 | +100 ppm | 0.03 | +100 ppm | 0.03 |
| Vitamin E - 50% | +75 ppm | 0.015 | +75 ppm | 0.015 | +75 ppm | 0.015 |
| Nucleotides (Cefipro, Leiber) | NA | 2 | NA | 2 | NA | 2 |
| Added Threonine | +20 wt % | 2.6 | +20 wt % | 2.6 | +20 wt % | 2.6 |
| Added Tryptophan | +10 wt % | 0.35 | +10 wt % | 0.35 | +10 wt % | 0.35 |
| Yucca (micro aid) | NA | 0.5 | NA | 0.5 | NA | 0.5 |
| Nutribull | NA | 2 | NA | 2 | NA | 2 |
| Filler | NA | 7.505 | NA | 7.305 | NA | 2.505 |
| Total | | 15.000 | | 15.000 | | 15.000 |

TABLE 2

Base feed composition.

| Ingredient | Control diet (base feed) | Diet A | Diet B | Diet C |
|---|---|---|---|---|
| Fish meal (anchovy) | 265.00 | 265.00 | 265.00 | 265.00 |
| Soybean meal, 48% CP, solvent extracted | 304.00 | 304.00 | 304.00 | 304.00 |
| Fish oil, tune oil, crude, co-products | 16.00 | 16.00 | 16.00 | 16.00 |
| Wheat flour | 263.50 | 263.50 | 263.50 | 263.50 |
| Krill meal | 20.00 | 20.00 | 20.00 | 20.00 |
| Wheat gluten meal, 78% CP | 35.00 | 35.00 | 35.00 | 35.00 |
| Choline chloride, 60% choline | 10.00 | 10.00 | 10.00 | 10.00 |
| Soy lecithin | 20.00 | 20.00 | 20.00 | 20.00 |
| Mono calcium phosphate, MCP, $Ca(H_2PO_4)_2$ | 15.00 | 15.00 | 15.00 | 15.00 |
| Salt, NaCl | 28.30 | 28.30 | 28.30 | 28.30 |
| Rovimix-stay-C 35, ascorbyl-monophosphate | 1.25 | 1.25 | 1.25 | 1.25 |
| Shrimpo premix (mix of vitamins and minerals) | 3.75 | 3.75 | 3.75 | 3.75 |
| DL-methionine | 1.60 | 1.60 | 1.60 | 1.60 |
| L-threonine | 3.00 | 3.00 | 3.00 | 3.00 |
| L-lysine | 2.50 | 2.50 | 2.50 | 2.50 |
| Carboxymethylcellulose (CMC) | 10.00 | 10.00 | 10.00 | 10.00 |
| Mold inhibitor (calcium phosphate) | 0.70 | 0.70 | 0.70 | 0.70 |
| Anti-oxidant (EQ & BHT) | 0.40 | 0.40 | 0.40 | 0.40 |
| Premix 1 (15 kg/T) | — | 15.00 | — | — |
| Premix 2 (15 kg/T) | — | — | 15.00 | — |
| Premix 3 (15 kg/T) | — | — | — | 15.00 |
| Total | 1000.00 | 1015.00 | 1015.00 | 1015.00 |

Eight different feeding treatments were designed as described in Table 3. WFS means white feces syndrome, and TSB means tryptic soy broth.

TABLE 3

Trial design.

| Treatment | Acclimation (2 days) | Pre-challenge (14 days) | WFS Per os challenge (3 days) | Post-challenge (42 days) |
|---|---|---|---|---|
| T1 (Negative control) | Control diet | Control diet | Control diet + sterilized TSB | Control diet |
| T2 (Positive control) | | Control diet | Control diet + WFS #5 | Control diet |
| Treatment 3 | | Control diet | | Diet A |
| Treatment 4 | | Diet A | | Control diet |
| Treatment 5 | | Control diet | | Diet B |
| Treatment 6 | | Diet B | | Control diet |
| Treatment 7 | | Control diet | | Diet C |
| Treatment 8 | | Diet C | | Control diet |

A total of 32 350 L tanks were used for the trial. All tanks were outfitted with an activated coral filter, aerated, and covered with plastic film to reduce the risk of cross-contamination. The tanks were filled up with 250 L of brackish water having a salinity of 20 parts per thousand.

Specific pathogen free (SPF) shrimp (*P. vannamei*) utilized in the trail were provided by ShrimpVet Dr. Tom® Hatchery (Ninh Thuan Province, Vietnam) obtained from the Shrimp Improvement Systems in Hawaii, USA (SIS Hawaii) broodstock. The shrimp were produced under strict bio-secure conditions and screened for all important pathogens including white spot syndrome virus (WSSV), infectious hypodermal and hematopoietic necrosis virus (IHHNV), acute hepatopancreatic necrosis disease (AHPND) using PCR and real-time PCR prior to receipt. The shrimp were then reared in primary quarantine tanks for 7 days. During the primary quarantine, the shrimp were checked for the above listed disease using PCR techniques to confirm the disease-free status of the stock and Enterocytozoon hepatopenaei (EHP). Then, the shrimp that passed the primary quanrantine were cultured in strict bio-secure conditions for secondary quarantine for 30 days to reach the juvenile stage which has an average weight of 1.13+/−0.04 g. The juveniles were checked again for the listed diseases using PCR techniques. The juveniles that pass through both of the quarantine periods were utilized for the trial.

The trial had 8 groups including 1 negative control, 1 positive control, and 6 treatments with 4 replicates each. The trial was set up as a completely randomized design (CRD).

Water quality parameters such as dissolved oxygen (DO), pH, and temperature were measured daily by handheld multiple meters. Total ammonia nitrogen, nitrite, and alkalinity were measured twice per week. Shrimp were fed ad libitum 4-6 times per day with their respective diets. Feed consumption was recorded during the trial. During the trial, water quality parameters were kept at optimal levels for shrimp growth.

Growth performance parameters were calculated as follows: Survival rate (%)=$N_f/N_i$)×100, wherein $N_f$ and $N_i$ were the quantities of shrimp at the final and initial time of the trial; mean weight gain (g)=final mean weight−initial mean weight; biomass gain (g)=final biomass−initial biomass; average daily growth (ADG) (g/day)=weight gain (g)/days of culture (day); specific growth rate (SGR) (%/day)=(Ln (final mean weight)−Ln (initial mean weight))/days of culture)×100; feed conversion ratio (FCR)=total feed intake (g)/biomass gain (g).

The experimental shrimp were sampled to check for important pathogens (WSSV, EHP, IMNV, TSV, and AHPND) before 5 days of stocking. The purpose of the test is to confirm the disease-free status of the experimental shrimp before starting the trial.

For the challenge method, Vibrio sp. Isolate was collected from WFS-affected P. vannamei on a shrimp farm in Vietnam and was given the reference code number WFS #5. The isolate has been confirmed by PCR detection and bioassay challenge on P. Vannamei. The treatments indicated in Table 3 included a per os challenge (Treatments 2-8). The bacterial density was measured by optical density absorbance ($OD_{600\ nm}$). The WFS #5 bacterial broth culture was mixed with diets for the challenge groups at a 1:2 ratio (v/w), then incubated for at least 2 hours at room temperature before fed to the shrimp. Shrimp in the negative control group were fed with the control diet coated with sterile TSB+ with the same procedure. Bacteria stock and feed inoculum were renewed every day for three consecutive days of challenge.

FIG. 1 illustrates the survival rates of the shrimp at the termination of the trial. FIG. 1 shows the mean (n=4) and the standards deviation (+/−). Bars on the plot that share the same letters indicate statistically insignificant differences (P>0.05) therebetween, and therefore bars on the plot with different letters are different with P<0.05. The shrimp that underwent treatments 3, 5, 6, and 8 outperformed the positive control group, with treatment 5 bringing survival rate the closest to the negative control.

At the trial termination, shrimp were harvested and individual shrimp weight were recorded for determining the growth performance parameters after 60 days of culture. Table 4 shows the growth performance parameters of the shrimp at the end of the trial the trial. In Table 4, values are presented as mean (n=4)+/−the standard deviation. Data that shares the same letter on the same row indicates statistically insignificant different (P>0.05) therebetween, while data that has different letters on the same row are significantly different (P<0.05). ADG means average daily growth, SGR means specific growth rate, and FCR means food conversion ratio.

TABLE 4

Growth performance parameters after 60 days of culture.

| Treatment | Initial weight (g) | Final weight (g) | Final biomass (g) | Mean weight gain (g) | ADG (g/day) | SGR (%/day) | FCR |
| --- | --- | --- | --- | --- | --- | --- | --- |
| T1 (Negative control) | 1.15 ± 0.04a | 17.11 ± 0.71ab | 601.25 ± 82.70a | 15.97 ± 0.74ab | 0.27 ± 0.01ab | 4.50 ± 0.12ab | 1.35 ± 0.20a |
| T2 (Positive control) | 1.10 ± 0.03a | 18.60 ± 2.76ab | 490.73 ± 45.15cd | 17.49 ± 2.77ab | 0.29 ± 0.05ab | 4.68 ± 0.27ab | 1.67 ± 0.36a |
| T3 (Control diet & Diet A) | 1.11 ± 0.04a | 18.51 ± 1.93ab | 531.88 ± 85.98abc | 17.40 ± 1.90ab | 0.29 ± 0.03ab | 4.68 ± 0.13ab | 1.37 ± 0.21a |
| T4 (Diet A & Control diet) | 1.12 ± 0.03a | 19.63 ± 1.37b | 492.15 ± 85.81abcd | 18.50 ± 1.39b | 0.31 ± 0.02b | 4.76 ± 0.15b | 1.62 ± 0.33a |
| T5 (Control diet & Diet B) | 1.12 ± 0.05a | 17.75 ± 1.20ab | 581.48 ± 85.21ab | 16.63 ± 1.17ab | 0.28 ± 0.02ab | 4.60 ± 0.10ab | 1.31 ± 0.17a |
| T6 (Diet B & Control diet) | 1.14 ± 0.04a | 19.14 ± 0.75ab | 499.00 ± 64.96abcd | 18.00 ± 0.76ab | 0.30 ± 0.01ab | 4.70 ± 0.10ab | 1.60 ± 0.19a |
| T7 (Control diet & Diet C) | 1.15 ± 0.05a | 17.87 ± 1.94ab | 433.37 ± 25.79d | 16.74 ± 1.92ab | 0.28 ± 0.03ab | 4.59 ± 0.16ab | 2.60 ± 1.34b |
| T8 (Diet C & Control diet) | 1.11 ± 0.06a | 16.53 ± 1.12a | 476.03 ± 34.78bcd | 15.41 ± 1.17a | 0.26 ± 0.02a | 4.49 ± 0.19a | 1.67 ± 0.27a |

After the 60-day culture, survival rate of shrimp in treatment T5 was significantly higher than the PC (P<0.05) and growth performance of shrimp in this treatment was better than the others and the PC (P>0.05). Prototype 2 with an application dosage of 1.5 kg/ton of feed showed positive effects on improving growth performance and mitigating the impact of white feces syndrome of infected shrimp.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Example 2

Three different feed compositions, test diets X and Y and a control diet, were made having the composition shown in Table 5 and using the Syrena® Boost phytogenic blend available from Delacon.

TABLE 5

Feed Composition

| Ingredients (g) | Control diet (base feed) | Diet X | Diet Y |
|---|---|---|---|
| Fish meal (anchovy) | 265.00 | 265.00 | 265.00 |
| Soybean meal, 48% CP, solvent extracted | 304.00 | 304.00 | 304.00 |
| Fish oil, tuna oil, crude, co-products | 16.00 | 16.00 | 16.00 |
| Wheat flour | 263.50 | 263.50 | 263.50 |
| Krill meal | 20.00 | 20.00 | 20.00 |
| Wheat gluten meal, 78% CP | 35.00 | 35.00 | 35.00 |
| Choline chloride, 60% choline | 10.00 | 10.00 | 10.00 |
| Soy lecithin | 20.00 | 20.00 | 20.00 |
| Mono calcium phosphate, MCP, $Ca(H_2PO_4)_2$ | 15.00 | 15.00 | 15.00 |
| Salt, NaCl | 28.30 | 28.30 | 28.30 |
| Rovimix-stay-C 35, ascorbyl-monophosphate | 1.25 | 1.25 | 1.25 |
| Shrimpo premix (mix of vitamins and minerals) | 3.75 | 3.75 | 3.75 |
| DL-methionine | 1.60 | 1.60 | 1.60 |
| L-threonine | 3.00 | 3.00 | 3.00 |
| L-lysine | 2.50 | 2.50 | 2.50 |
| Carboxymethylcellulose (CMC) | 10.00 | 10.00 | 10.00 |
| Mold inhibitor (calcium phosphate) | 0.70 | 0.70 | 0.70 |
| Anti-oxidant (EQ & BHT) | 0.40 | 0.40 | 0.40 |
| Phytogenic blend | — | 0.20 | 0.50 |

Each feed was thoroughly mixed/added with all feed ingredients before being moisturized (35-40%) and extruded. The extruded feed came out like spaghetti, and was then dried at 50° C. for 6 hours. The final moisture of the feed did not exceed 10.5%. The feed was crushed to a size of 1.5-2 mm in length and used for the trial.

The trial had 6 feeding treatments including 1 negative control, 1 positive control, and 4 treatments with 4 replicates each as described in Table 6. The trial was set up as a completely randomized design (CRD). WFS means white feces syndrome. Pre means pre-challenge. Post means post-challenge. Shrimp were fed for a period of 60 days. This period divided into a pre-challenge period (days 0 to 14), a challenge period (days 15 to 18) and a post challenge period (days 19 to 60). Shrimp were fed ad libitum 4-6 times per day with their respective diets.

The shrimp were produced under strict bio-secure conditions and screened for all important pathogens including white spot syndrome virus (WSSV), infectious hypodermal and hematopoietic necrosis virus (IHHNV), acute hepatopancreatic necrosis disease (AHPND) using PCR and real-time PCR prior to receipt. The shrimp were then reared in primary quarantine tanks. During the primary quarantine, the shrimp were checked for the above listed disease using PCR techniques to confirm the disease-free status of the stock and Enterocytozoon hepatopenaei (EHP). Then, the shrimp that passed the primary quanrantine were cultured in strict bio-secure conditions for secondary quarantine to reach the juvenile stage which has an approximate weight of 1.30 g. The juveniles were checked again for the listed diseases using PCR techniques. The juveniles that pass through both of the quarantine periods were utilized for the trial.

The estimated bacterial CFU delivered to the shrimp is described in Table 7.

TABLE 6

Trial design.

| Treatment | Diet | Replicates | Shrimp Size (g) | Stocking Density (Shrimp/350 L tank) | WFS Challenge |
|---|---|---|---|---|---|
| T1 (Negative control) | Control diet | 4 | 1.30 +/− 0.02 | 50 | No |
| T2 (Positive control) | Control diet | 4 | 1.31 +/− 0.01 | 50 | Yes |
| T3 0.2 g/Kg Pre | Diet X | 4 | 1.28 +/− 0.03 | 50 | Yes |
| T4 0.5 g/Kg Pre | Diet Y | 4 | 1.31 +/− 0.03 | 50 | Yes |
| T5 0.2 g/Kg Post | Diet X | 4 | 1.31 +/− 0.03 | 50 | Yes |
| T6 0.5 g/Kg Post | Diet Y | 4 | 1.30 +/− 0.02 | 50 | Yes |

TABLE 7

Estimated bacterial CFU delivered to shrimps

| No. | Name of sample | Date of collected sample | Total vibrio counts in broth culture (CFU/mL) | Estimated vibrio counts in inoculum feed (CFU/gram) | Estimated vibrio delivered to shrimp (CFU/gram) |
|---|---|---|---|---|---|
| 1 | WFD5 | 9 Dec. 2021 | 3.45e+/−09 | 1.15e+/−09 | 7.67e+/−07 |
| 2 | WFD5 | 10 Dec. 2021 | 2.11e+/−09 | 7.03e+/−08 | 4.69e+/−07 |
| 3 | WFD5 | 11 Dec. 2021 | 1.47e+/−09 | 4.90e+/−08 | 3.27e+/−07 |

Water quality parameters such as dissolved oxygen (DO), pH, and temperature were measured daily by handheld multiple meters. Total ammonia nitrogen (TAN), nitrite, and alkalinity were measured twice per week. The measurements are shown in Table 8. During the trial, water quality parameters were kept at optimal levels for shrimp growth.

TABLE 8

Water quality parameters

| Treatment | Temp (C.) | DO (ppm) | pH | Alkalinity (ppm) | TAN (ppm) | Nitrite (ppm) |
|---|---|---|---|---|---|---|
| T1 (Negative control) | 28.00 +/− 0.38 | 6.47 +/− 0.05 | 7.98 +/− 0.09 | 125.44 +/− 13.90 | 0.26 +/− 0.35 | 3.27 +/− 0.75 |
| T2 (Positive control) | 27.95 +/− 0.40 | 6.47 +/− 0.05 | 7.97 +/− 0.09 | 127.09 +/− 12.55 | 0.35 +/− 0.58 | 3.36 +/− 1.05 |
| T3 0.2 g/Kg Pre | 27.96 +/− 0.40 | 6.46 +/− 0.04 | 7.97 +/− 0.09 | 125.48 +/− 11.35 | 0.30 +/− 0.58 | 3.27 +/− 1.37 |
| T4 0.5 g/Kg Pre | 27.99 +/− 0.38 | 6.47 +/− 0.05 | 7.97 +/− 0.08 | 127.05 +/− 14.98 | 0.32 +/− 0.43 | 3.45 +/− 1.04 |
| T5 0.2 g/Kg Post | 28.04 +/− 0.42 | 6.46 +/− 0.04 | 7.96 +/− 0.09 | 128.68 +/− 13.46 | 0.23 +/− 0.23 | 3.50 +/− 1.10 |
| T6 0.5 g/Kg Post | 28.07 +/− 0.40 | 6.67 +/− 0.05 | 7.96 +/− 0.08 | 127.07 +/− 14.86 | 0.30 +/− 0.44 | 3.45 +/− 0.85 |

Growth performance parameters were calculated as follows: Survival rate (%)=$N_f/N_i$×100, wherein $N_f$ and $N_i$ were the quantities of shrimp at the final and initial time of the trial; mean weight gain (g)=final mean weight-initial mean weight; biomass gain (g)=final biomass-initial biomass; average daily growth (ADG) (g/day)=weight gain (g)/days of culture (day); specific growth rate (SGR) (%/day)=(Ln (final mean weight)−Ln (initial mean weight))/days of culture)×100; feed conversion ratio (FCR)=total feed intake (g)/biomass gain (g).

The experimental shrimp were sampled to check for important pathogens (WSSV, EHP, IMNV, TSV, and AHPND) before 5 days of stocking. The purpose of the test is to confirm the disease-free status of the experimental shrimp before starting the trial.

For the challenge method, *Vibrio* sp. Isolate was collected from WFS-affected *P. vannamei* on a shrimp farm in Vietnam and was given the reference code number WFS #5. The isolate was confirmed by PCR detection and bioassay challenge on P. Vannamei. The treatments indicated in Table 5 included a per os challenge (Treatments 2-6). The bacterial density was measured by optical density absorbance ($OD_{600\ nm}$). The WFS #5 bacterial broth culture was mixed with diets for the challenge groups at a 1:2 ratio (v/w), then incubated for at least 2 hours at room temperature before fed to the shrimp. Shrimp in the negative control group were fed with the control diet coated with sterile TSB+ with the same procedure. Bacteria stock and feed inoculum were renewed every day for three consecutive days of challenge.

There were gross signs of WFS after 48-hours post challenge. FIG. 2 illustrates the survival rates of the shrimp at the termination of the trial. FIG. 3 illustrates the average weight gain. FIG. 4, illustrates the effect on feed conversion rate (FCR). FIG. 5, illustrates the effect on feed intake. FIG. 6, illustrates the effect on final biomass. FIGS. 7(a-b), illustrate the effect on immune parameters as measured by total hemocytes count THC and phenoloxidase activity (PO). The shrimp that underwent treatments T3, T4, T5, and T6 outperformed the positive control group. After the 60-day culture, survival rate of shrimp in treatment T3 (0.2 g/Kg Pre) was significantly higher than the positive control (PC) ($P<0.05$) and growth performance of shrimp using a feed composition containing a phytogenic blend of the present invention outperformed the PC ($P<0.05$).

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

EXEMPLARY ASPECTS

The following exemplary aspects are provided, the numbering of which is not to be construed as designating levels of importance:

Aspect 1 provides a shrimp feed additive comprising:
a phytogenic component comprising
an extract of *Quillaja saponaria*,
capsaicin,
trans-anethole, or
a combination thereof:
wherein when fed to shrimp the shrimp feed additive is effective to prevent, reduce the occurrence of, treat, and/or facilitate recovery from white feces syndrome in the shrimp.

Aspect 2 provides a shrimp feed additive comprising:
a phytogenic component comprising
an extract of *Quillaja saponaria*,
capsaicin, and
trans-anethole:
wherein when fed to shrimp the shrimp feed additive is effective to prevent, reduce the occurrence of, treat, and/or facilitate recovery from white feces syndrome in the shrimp.

Aspect 3 provides the shrimp feed additive of any one of Aspects 1-2, wherein the phytogenic component is 0.01 wt % to 99.99 wt % of the shrimp feed additive.

Aspect 4 provides the shrimp feed additive of any one of Aspects 1-3, wherein the phytogenic component is 0.15 wt % to 15 wt % of the shrimp feed additive.

Aspect 5 provides the shrimp feed additive of any one of Aspects 1-4, wherein the phytogenic component includes more than one compound.

Aspect 6 provides the shrimp feed additive of any one of Aspects 1-5, wherein the phytogenic component comprises or further comprises a flavonoid, a tannin, a saponin, a mucilage, a bitter substance, an essential oil, a pungent substance, or a combination thereof.

Aspect 7 provides the shrimp feed additive of any one of Aspects 1-6, wherein the phytogenic component comprises or further comprises cayenne pepper, ginger, onion, elderflower, citrus, grape, chestnut, oak, tea, *ginseng, yucca, quillaja*, fenugreek, linseed, chamomile, gentian, dandelion, hops, caraway, star anise, thyme, garlic, cinnamon, an extract thereof, or a combination thereof.

Aspect 8 provides the shrimp feed additive of any one of Aspects 1-7, wherein one or more essential oils and/or extracts thereof in the phytogenic component comprise encapsulated oil particles.

Aspect 9 provides the shrimp feed additive of Aspect 8, wherein the encapsulated oil particles comprise an encapsulating shell that protects the essential oil during processing and storage and provides release of the essential oil in a shrimp's digestive tract.

Aspect 10 provides the shrimp feed additive of any one of Aspects 8-9, wherein the encapsulating shell comprises starch, protein, or a combination thereof.

Aspect 11 provides the shrimp feed additive of any one of Aspects 1-10, wherein the capsaicin is 0.001 wt % to 99.999 wt % of the phytogenic component.

Aspect 12 provides the shrimp feed additive of any one of Aspects 1-11, wherein the trans-anethole is 0.001 wt % to 99.999 wt % of the phytogenic component.

Aspect 13 provides the shrimp feed additive of any one of Aspects 1-12, wherein the extract of *Quillaja saponaria* is 0.001 wt % to 99.999 wt % of the phytogenic component.

Aspect 14 provides the shrimp feed additive of any one of Aspects 1-13, wherein the phytogenic component comprises encapsulated particles of the extract of *Quillaja saponaria*.

Aspect 15 provides the shrimp feed additive of any one of Aspects 1-14, wherein the phytogenic component comprises cayenne pepper which is a source of the capsaicin.

Aspect 16 provides the shrimp feed additive of any one of Aspects 1-15, wherein the phytogenic component comprises star anise extract which is a source of the trans-anethole.

Aspect 17 provides the shrimp feed additive of Aspect 16, wherein the phytogenic component comprises encapsulated star anise extract particles.

Aspect 18 provides the shrimp feed additive of any one of Aspects 1-17, wherein the phytogenic component further comprises cinnamon.

Aspect 19 provides the shrimp feed additive of any one of Aspects 1-18, wherein the phytogenic component further comprises a fermentation metabolite product from yeast.

Aspect 20 provides the shrimp feed additive of any one of Aspects 1-19, wherein the shrimp feed additive further comprises a nutritional component.

Aspect 21 provides the shrimp feed additive of Aspects 20, wherein the nutritional component is 0.4 wt % to 80 wt % of the shrimp feed additive.

Aspect 22 provides the shrimp feed additive of any one of Aspects 20-21, wherein the nutritional component is 4 wt % to 60 wt % of the shrimp feed additive.

Aspect 23 provides the shrimp feed additive of any one of Aspects 20-22, wherein the nutritional component comprises one or more vitamins, nutrients, nucleic acids, and/or nucleotides.

Aspect 24 provides the shrimp feed additive of any one of Aspects 20-23, wherein the nutritional component comprises vitamin C.

Aspect 25 provides the shrimp feed additive of Aspect 24, wherein the vitamin C is 0.001 wt % to 3 wt % of the shrimp feed additive.

Aspect 26 provides the shrimp feed additive of any one of Aspects 20-25, wherein the nutritional component comprises vitamin E.

Aspect 27 provides the shrimp feed additive of Aspect 26, wherein the vitamin E is 0.001 wt % to 1.5 wt % of the shrimp feed additive.

Aspect 28 provides the shrimp feed additive of any one of Aspects 20-27, wherein the nutritional component comprises one or more nucleotides.

Aspect 29 provides the shrimp feed additive of Aspect 28, wherein the one or more nucleotides are 0.2 wt % to 80 wt % of the shrimp feed additive.

Aspect 30 provides the shrimp feed additive of any one of Aspects 20-29, wherein the nutritional component comprises cell contents and/or cell walls of brewer's yeast.

Aspect 31 provides the shrimp feed additive of Aspect 30, wherein the cell contents and/or cell walls of brewer's yeast is 0.002 wt % to 2 wt % of the shrimp feed additive.

Aspect 32 provides the shrimp feed additive of any one of Aspects 20-31, wherein the nutritional component comprises threonine.

Aspect 33 provides the shrimp feed additive of Aspect 32, wherein the threonine is 0.2 wt % to 80 wt % of the shrimp feed additive.

Aspect 34 provides the shrimp feed additive of any one of Aspects 20-33, wherein the nutritional component comprises tryptophan.

Aspect 35 provides the shrimp feed additive of Aspect 34, wherein the tryptophan is 0.03 wt % to 30 wt % of the shrimp feed additive.

Aspect 36 provides the shrimp feed additive of any one of Aspects 20-35, wherein the nutritional component comprises glucuronolactone.

Aspect 37 provides the shrimp feed additive of Aspect 36, wherein the glucuronolactone is 0.2 wt % to 80 wt % of the shrimp feed additive.

Aspect 38 provides the shrimp feed additive of any one of Aspects 1-37, further comprising a *yucca* extract.

Aspect 39 provides the shrimp feed additive of any one of Aspects 1-38, wherein the *yucca* extract is 0.04 wt % to 40 wt % of the shrimp feed additive.

Aspect 40 provides the shrimp feed additive of any one of Aspects 1-39, wherein the *yucca* extract is 0.4 wt % to 8 wt % of the shrimp feed additive.

Aspect 41 provides the shrimp feed additive of any one of Aspects 1-40, wherein when fed to shrimp the shrimp feed additive is effective to prevent or reduce the occurrence of white feces syndrome in the shrimp.

Aspect 42 provides the shrimp feed additive of any one of Aspects 1-41, wherein when fed to shrimp the shrimp feed additive is effective to treat white feces syndrome in the shrimp.

Aspect 43 provides the shrimp feed additive of any one of Aspects 1-42, wherein when fed to shrimp the shrimp feed additive is effective to facilitate recovery from white feces syndrome in the shrimp.

Aspect 44 provides the shrimp feed additive of any one of Aspects 1-43, wherein when fed to shrimp the shrimp feed additive is effective to
  prevent or reduce the occurrence of,
  treat, and
  facilitate recovery from white feces syndrome in the shrimp.

Aspect 45 provides the shrimp feed additive of any one of Aspects 1-44, wherein the shrimp feed additive is effective to prevent, reduce the occurrence of, treat, and/or facilitate recovery from white feces syndrome in a shrimp that is *Hadropenaeus lucasii, Haliporoides diomedeae, Haliporoides sibogae, Haliporoides triarthrus Stebbing, Hymenopenaeus aequalis, Pleoticus muelleri, Pleoticus robustus, Solenocera africana, Solenocera agassizii, Solenocera choprai, Solenocera crassicornis, Solenocera florea, Solenocera geijskesi, Solenocera hextii, Solenocera koelbeti, Solenocera membranacea, Solenocera pectinate, Aristaeomorpha foliacea, Aristaeomorpha woodmasoni, Aristeus alcocki, Aristeus antennatus, Aristeus semidentatus, Aristeus varidens, Aristeus virilis, Plesiopenaeus edwardsianus, Artemesia longinaris, Atypopenaeus formosus, Atypopenaeus stenodactylus, Macropetasma africana, Metapenaeopsis acclivis, Metapenaeopsis andamanensis, Metapenaeopsis barbata, Metapenaeopsis borradailei, Metapenaeopsis crassissima Metapenaeopsis dalei, Metapenueopsis goodei, Metapenaeopsis hilarula, Metapenaeopsis lamellata, Metapenaeopsis lata, Metapenaeopsis mogiensis, Metapenueopsis novaeguineae, Metapenaeopsis palmensis, Metapenaeopsis philippi, Metapenaeopsis rosea, Metapenaeopsis stridulans, Metapenaeopsis toloensis, Metapenaeus affinis, Metapenaeus alcocki, Metapenaeus bennettae, Metapenaeus brevicomis, Metapenaeus conjunctus, Metapenaeus dalli, Metapenaeus demani, Metapenaeus dobsoni, Metapenaeus eboracensis, Metapenaeus elegans, Metapenueus endeavouri, Metapenaeus ensis, Metapenaeus insolitus, Metapenaeus intermedius, Metapenueus joyneri, Metapenaeus kutchensis, Metapenaeus lysianassa, Metapenueus macleaya, Metapenueus monoceros, Metapenueus movebi, Metapenaeus papuensis, Metapenaeus stebbingi, Metapenaeus tenuines, Parapenaeus australiensis, Parapenaeus fissurus, Parapenaeus investigatoris, Parapenaeus lanceolatus, Parapenaeus longipes, Parapenaeus longirostris, Parapenaeus sextuberculatus, Penaeopsis rectacuta, Parapenaeopsis acclivirostris, Parapenaeopsis arafurica, Parapenaeopsis atlantica, Parapenaeopsis cornuta, Parapenaeopsis coromandelica, Parapenaeopsis hardwickii, Parapenaeopsis hungerfordi, Parapenaeopsis maxillipedo, Parapenaeopsis nana, Parapenaeopsis probate, Parapenaeopsis sculptilis, Parapenaeopsis stylifera, Parapenaeopsis tenella, Parapenaeopsis uncta, Parapenaeopsis venusta, Parapenaeus australiensis, Parapenaeus fissurus, Parapenaeus investigatoris, Parapenaeus lanceolatus, Parapenaeus longipes, Parapenaeus longirostris, Parapenaeus sextuberculatus, Penaeopsis rectacuta, Penaeopsis serrata, Penaeus (Farfantepenaeus) aztecus, Penaeus (Farfantepenaeus) brasiliensis, Penaeus (Farfantepenaeus) brevirostris, Penaeus (Farfantepenaeus) californiensis, Penaeus (Farfantepenaeus) duorarum, Penaeus (Farfantepenaeus) notialis, Penaeus (Farfantepenaeus) paulensis, Penaeus (Farfantepenaeus) subtilis, Penaeus (Fenneropenueus) chinensis, Penaeus (Fenneropenaeus) indicus, Penaeus (Fenneropenaeus) merguiensis, Penaeus (Fenneropenaeus) penicillatus, Penaeus (Litopenaeus) occidentalis, Penaeus (Litopenaeus) schmitti, Penaeus (Litopenaeus) setiferus, Penaeus (Litopenaeus) stylirostris, Penaeus (Litopenaeus) vannamei, Penaeus (Marsupenaeus) japonicus, Penaeus (Melicertus) canaliculatus, Penaeus (Melicertus) kerathurus, Penaeus (Melicertus) latisulcatus, Penaeus (Melicertus) longistylus, Penaeus (Melicertus) marginatus, Penaeus (Melicertus) plebejus, Penaeus (Penaeus) esculentus, Penaeus (Penaeus) monodon, Penaeus (Penaeus) semisulcatus, Protrachypene precipua, Trachypenaeus anchoralis, Trachypenaeus byrdi, Trachypenaeus constrictus, Trachypenaeus curvirostris, Trachypenaeus faoe, Trachypenaeus fulvus, Trachypenaeus fuscina, Trachypenaeus gonospinifer, Trachypenaeus granulosus, Trachypenaeus pacificus, Trachypenaeus sedili, Trachypenaeus similis, Xiphopenaeus kroveri, Xiphopenaeus riveti, Sicyonia brevirostris, Sicyonia burkenroadi, Sicyonia carinata, Sicyona cristata, Sicyonia dorsalis, Sicyonia galeata, Sicyonia ingentis, Sicyonia lancifera, Sicyonia stimpsoni, Sicyonia typica, Acetes americanus, Acetes australis, Acetes chinensis, Acetes erythraeus, Acetes indicus, Acetes intermedius, Acetes japonicus, Acetes serrulatus, Acetes sibogae, Acetes vulgaris, Sergetes lucens, Atya gabonensis, Atya innocous, Atya pilipes, Atya scabra, Atya spinipes, Atya sulcatipes, Caridina africana, Caridina denticulate, Caridina edulis, Caridina gracilirostris, Caridina laevis, Caridina nilotica, Caridina propinqua, Caridina tonkinensis, Caridina weberi, Paratya compressa, Glyphus marsupialis, Leptochela gracilis, Pasiphaea japonica, Pasiphaea multidentate, Pasiphaea sivado, Rhynchocinetes typus, Lipkius holthuisi, Campylonotus rathbunae, Cryphiops caementarius, Exopalaemon annandalei, Exopalaemon carinicauda, Exopalaemon mani, Exopalaemon modestus, Exopalaemon orientis, Exopalaemon styliferus, Leptocarpus fluminicola, Leptocarpus potamiscus, Macrobrachium acanthurus, Macrobrachium aemulum, Macrobrachium amazonicum, Macrobrachium Americanum, Macrobrachium australe, Macrobrachium birmanicum, Macrobrachium caledonicum, Macrobrachium carcinus, Macrobrachium choprai, Macrobrachium dayanum, Macrobrachium dux, Macrobrachium equidens, Macrobrachium esculentum, Macrobrachium formosense, Macrobrachium geron, Macrobrachium grandimanus, Macrobrachium heterochirus, Macrobrachium idea, Macrobrachium idella, Macrobrachium intermedium, Macrobrachium jaroense, Macrobrachium javanicum, Macro-*

*brachium jelskii, Macrobrachium lamarrei, Macrobrachium lanceifrons, Macrobrachium lanchesteri, Macrobrachium lar, Macrobrachium latidactylus, Macrobrachium latimanus, Macrobrachium lepidactyloides, Macrobrachium lepidactylus, Macrobrachium macrobrachion, Macrobrachium malcolmsonii, Macrobrachium mammillodactylus, Macrobrachium mirabile, Macrobrachium nipponense, Macrobrachium ohione, Macrobrachium olfersii, Macrobruchium patsa, Macrobrachium pilimanus, Macrobrachium raridens, Macrobrachium rosenbergii, Macrobrachium rude, Macrobrachium scabriculum, Macrobrachium sintangense, Macrobrachium tenellum, Macrobrachium trompii, Macrobrachium villosimanus, Macrobrachium vollenhovenii, Nematopalaemon hastatus, Nematopalaemon schmitti, Nematopalaemon tenuipes, Palaemon adspersus, Palaemon concinnus, Palaemon elegans, Palaemon gravieri, Palaemon longirostris, Palaemon macrodactylus, Palaemon maculatus, Palaemon northropi, Palaemon ortmanni, Palaemon pacificus, Palaemon pandaliformis, Palaemon paucidens, Palaemon serratus, Palaemon serrifer, Palaemon xiphias, Palaemonetes kadiakensis, Palaemonetes paludosus, Palaemonetes sinensis, Palaemonetes tonkinensis, Palaemonetes varians, Palaemonetes vulgaris, Alpheus bisincisus, Alpheus brevicristatus, Alpheus digitalis, Alpheus euphrosyne, Alpheus glaber, Alpheus gracilipes, Alpheus heterochaelis, Alpheus hoplocheles, Alpheus japonicus, Alpheus spongiarum, Alpheus stephensoni, Alpheus sublucanus, Ogyrides orientalis, Eualus leptognathus, Eualus macilentus, Eualus sinensis, Exhippolysmata ensirostris, Exhippolysmata hastatoides, Exhippolysmata oplophoroides, Heptacarpus brevirostris, Heptacarpus futilirostris, Heptacarpus geniculatus, Heptacarpus pandaloides, Latreutes acicularis, Latreutes anoplonyx, Latreutes laminirostris, Latreutes planirostris, Lysmata californica, Lysmata seticuadata, Lysmata vittata, Spirontocaris lilljeborgii, Spirontocaris spinus, Processa canaliculata, Processa edulis, Chlorotocus crassicornis, Dichelopandalus bonnieri, Heterocarpoides levicarina, Heterocarpus dorsalis, Heterocarpus ensifer, Heterocarpus gibbosus, Heterocarpus laevigatus, Heterocarpus reedi, Heterocarpus sibogae, Heterocarpus tricarinatus, Heterocarpus vicarius, Heterocarpus woodmasoni, Pandalopsis dispar, Pandalopsis japonica, Pandalus borealis, Pandalus danae, Pandalus goniurus, Pandalus hypsinotus, Pandalus jordani, Pandalus kessleri, Pandalus montagui, Pandalus nipponensis, Pandalus platyceros, Parapandalus narval, Parapandalus spinipes, Plesionika acanthonotus, Plesionika alcocki, Plesionika antigai, Plesionika edwardsii, Plesionika ensis, Plesionika gigliolii, Plesionika heterocarpus, Plesionika martia, Plesionika williamsi, Argis lar, Crangon affinis, Crangon alaskensis, Crangon communis, Crangon crangon, Crangon franciscorum, Crangon nigricauda, Crangon nigromaculata, Crangon septemspinosa, Pontocaris lacazei, Pontocaris pennata, Pontophilus spinosus,* or *Sclerocrangon salebrosa.*

Aspect 46 provides the shrimp feed additive of any one of Aspects 1-45, wherein the shrimp feed additive is effective to prevent, reduce the occurrence of, treat, and/or facilitate recovery from white feces syndrome in a shrimp that is *P. vannamei.*

Aspect 47 provides a shrimp feed comprising:
the shrimp feed additive of any one of Aspects 1-46; and
a base feed component.

Aspect 48 provides the shrimp feed of Aspect 47, wherein the base feed component comprises proteins, carbohydrates, fat, fiber, vitamins, minerals, a phosphorus source, or a combination thereof.

Aspect 49 provides the shrimp feed of any one of Aspects 47-48, wherein the shrimp feed additive is 0.01 wt % to 50 wt % of the shrimp feed.

Aspect 50 provides the shrimp feed of any one of Aspects 47-49, wherein the shrimp feed additive is 0.1 wt % to 15 wt % of the shrimp feed.

Aspect 51 provides the shrimp feed of any one of Aspects 47-50, wherein the shrimp feed additive is 1 wt % to 2 wt % of the shrimp feed.

Aspect 52 provides the shrimp feed of any one of Aspects 47-51, wherein the base feed component is 50 wt % to 99.99 wt % of the shrimp feed.

Aspect 53 provides the shrimp feed of any one of Aspects 47-52, wherein the base feed component is 85 wt % to 99.9 wt % of the shrimp feed.

Aspect 54 provides the shrimp feed of any one of Aspects 47-53, wherein the base feed component is 98 wt % to 99 wt % of the shrimp feed.

Aspect 55 provides the shrimp feed of any one of Aspects 47-54, wherein the phytogenic component is 0.0001 wt % to 0.2 wt % of the shrimp feed.

Aspect 56 provides the shrimp feed of any one of Aspects 47-55, wherein the phytogenic component is 0.002 wt % to 0.04 wt % of the shrimp feed.

Aspect 57 provides the shrimp feed of any one of Aspects 47-56, wherein the nutritional component is 0.0005 wt % to 5 wt % of the shrimp feed.

Aspect 58 provides the shrimp feed of any one of Aspects 47-57, wherein the nutritional component is 0.05 wt % to 1 wt % of the shrimp feed.

Aspect 59 provides the shrimp feed of any one of Aspects 47-58, wherein the shrimp feed has the form of a flake, tablet, pellet, or a combination thereof.

Aspect 60 provides a shrimp feed additive comprising:
a nutritional component comprising one or more vitamins, nutrients, nucleic acids, and/or nucleotides;
wherein when fed to shrimp the shrimp feed additive is effective to prevent, reduce the occurrence of, treat, and/or facilitate recovery from white feces syndrome in the shrimp.

Aspect 61 provides the shrimp feed additive of Aspect 60, further comprising a phytogenic component.

Aspect 62 provides a shrimp feed comprising:
the shrimp feed additive of any one of Aspects 60-61; and
a base feed component.

Aspect 63 provides a shrimp feed additive comprising:
a phytogenic component comprising
encapsulated particles comprising an extract of *Quillaja saponaria,*
cayenne pepper, and
encapsulated particles comprising a star anise extract,
wherein the encapsulated particles comprising the extract of *Quillaja saponaria* and the encapsulated particles comprising the star anise extract comprise encapsulating shells that protects the extracts during processing and storage and provides release of the extracts in a shrimp's digestive tract; and
a nutritional component comprising one or more vitamins, nutrients, nucleic acids, and/or nucleotides;
wherein when fed to shrimp the shrimp feed additive is effective to prevent, reduce the occurrence of, treat, and/or facilitate recovery from white feces syndrome in the shrimp.

Aspect 64 provides a shrimp feed comprising the shrimp feed additive of 63 and a base feed component, wherein the phytogenic component is 0.0001 wt % to 0.2 wt % of the shrimp feed.

Aspect 65 provides a method of making a shrimp feed additive, the method comprising:
    combining the phytogenic component with a nutritional component to form the shrimp feed additive;
    wherein when fed to shrimp the shrimp feed additive is effective to prevent, reduce the occurrence of, treat, and/or facilitate recovery from white feces syndrome in the shrimp.

Aspect 66 provides a method of making the shrimp feed of any one of Aspects 47-59, 62, or 64, the method comprising:
    combining the shrimp feed additive of any one of Aspects 1-46, 60-61, or 63, with a base feed component to form the shrimp feed.

Aspect 67 provides a method of feeding shrimp, the method comprising:
    feeding shrimp a feed composition comprising the shrimp feed additive of any one of Aspects 1-46, 60-61, or 63;
    wherein the method is effective to prevent, reduce the occurrence of, treat, and/or facilitate recovery from white feces syndrome in the shrimp.

Aspect 68 provides the method of Aspect 67, wherein the feed composition is the shrimp feed composition of any one of Aspects 47-59, 62, or 64.

Aspect 69 provides the method of any one of Aspects 67-68, wherein the method comprises feeding the shrimp feed composition to shrimp 1 to 10 times per day.

Aspect 70 provides the method of any one of Aspects 67-69, wherein the method comprises feeding the shrimp feed composition to shrimp 3 to 7 times per day.

Aspect 71 provides the method of any one of Aspects 67-70, wherein the method results in a higher survival rate of the shrimp as compared to shrimp not fed the feed composition.

Aspect 72 provides the method of any one of Aspects 67-71, wherein the method results in a higher average daily gain, a higher specific growth rate, a higher weight gain, a higher feed conversion ratio, or a combination thereof, as compared to shrimp not fed the feed composition.

Aspect 73 provides the method of any one of Aspects 67-72, wherein the method is effective to prevent or reduce the occurrence of white feces syndrome in the shrimp.

Aspect 74 provides the method of any one of Aspects 67-73, wherein at least some of the shrimp have white feces syndrome.

Aspect 75 provides the method of Aspect 74, wherein the method is effective to treat white feces syndrome in the shrimp.

Aspect 76 provides the method of any one of Aspects 74-75, wherein the method is effective to facilitate recovery of the shrimp having white feces syndrome.

Aspect 77 provides the method of any one of Aspects 74-76, wherein the method results in a higher survival rate of the shrimp having white feces syndrome as compared to shrimp having white feces syndrome that are not fed the feed composition.

Aspect 78 provides the method of any one of Aspects 74-77, wherein the method results in a higher average daily gain of the shrimp having white feces syndrome as compared to shrimp having white feces syndrome that are not fed the feed composition.

Aspect 79 provides the method of any one of Aspects 74-78, wherein the method results in a higher specific growth rate of the shrimp having white feces syndrome as compared to shrimp having white feces syndrome that are not fed the feed composition.

Aspect 80 provides the method of any one of Aspects 74-79, wherein the method results in a higher feed conversion ratio of the shrimp having white feces syndrome as compared to shrimp having white feces syndrome that are not fed the feed composition.

Aspect 81 provides a method of feeding shrimp, the method comprising:
    feeding shrimp a feed composition comprising
        a shrimp feed additive comprising
            a phytogenic component that is 0.0001 wt % to 0.2 wt % of the shrimp feed, the phytogenic component comprising
                encapsulated particles comprising an extract of *Quillaja saponaria*,
                cayenne pepper, and
                encapsulated particles comprising a star anise extract,
                wherein the encapsulated particles comprising the extract of *Quillaja saponaria* and the encapsulated particles comprising the star anise extract comprise encapsulating shells that protect the extracts during processing and storage and provide release of the extracts in a shrimp's digestive tract; and
            a nutritional component comprising one or more vitamins, nutrients, nucleic acids, and/or nucleotides;
        a base feed component;
    wherein the method is effective to prevent, reduce the occurrence of, treat, and/or facilitate recovery of white feces syndrome in the shrimp.

Aspect 82 provides the method of Aspect 81, wherein at least some of the shrimp have white feces syndrome.

Aspect 83 provides the shrimp feed additive, shrimp feed, or method of any one or any combination of Aspects 1-82 optionally configured such that all elements or options recited are available to use or select from.

What is claimed is:

1. A method of feeding shrimp, the method comprising:
    feeding shrimp a feed composition comprising a shrimp feed additive comprising:
    a phytogenic component comprising
        *Quillaja saponaria*,
        capsaicin, and
        trans-anethole;
    wherein the method is effective to prevent, reduce the occurrence of, treat, and/or facilitate recovery from white feces syndrome in the shrimp; and
    wherein at least some of the shrimp have white feces syndrome, wherein the method results in a higher survival rate of the shrimp having white feces syndrome, a higher average daily gain of the shrimp having white feces syndrome, a higher specific growth rate of the shrimp having white feces, a higher feed conversion ratio of the shrimp having white feces syndrome, or a combination thereof, as compared to shrimp having white feces syndrome that are not fed the feed composition.

2. The method of claim 1, wherein the method results in a higher average daily gain, a higher specific growth rate, a higher weight gain, a higher feed conversion ratio, or a combination thereof, as compared to shrimp not fed the feed composition.

3. The shrimp feed additive of claim 1, wherein the phytogenic component is 0.15 wt % to 15 wt % of the shrimp feed additive.

4. The shrimp feed additive of claim 1, wherein the phytogenic component comprises one or more essential oils and/or extracts thereof, and the phytogenic component comprise encapsulated particles that comprise an encapsulating matrix or shell that protects the one or more essential oils and/or extract during processing and storage and provides release of the essential oil and/or extract in a shrimp's digestive tract.

5. The shrimp feed additive of claim 1, wherein the phytogenic component comprises encapsulated particles of *Quillaja saponaria*.

6. The shrimp feed additive of claim 1, wherein the phytogenic component comprises cayenne pepper which is a source of the capsaicin.

7. The shrimp feed additive of claim 1, wherein the phytogenic component comprises star anise extract which is a source of the trans-anethole.

8. The shrimp feed additive of claim 7, wherein the phytogenic component comprises encapsulated star anise extract particles.

9. The shrimp feed additive of claim 1, wherein the phytogenic component further comprises a fermentation metabolite product from yeast.

10. The shrimp feed additive of claim 1, wherein the shrimp feed additive further comprises a nutritional component that is 0.4 wt % to 80 wt % of the shrimp feed additive.

11. The shrimp feed additive of claim 10, wherein the nutritional component comprises one or more vitamins, nutrients, nucleic acids, and/or nucleotides; vitamin C; vitamin E; one or more nucleotides; cell contents and/or cell walls of brewer's yeast; threonine; tryptophan; glucuronolactone; or a combination thereof.

12. A method of feeding shrimp, the method comprising:
feeding shrimp a feed composition comprising
  a shrimp feed additive comprising
    a phytogenic component that is 0.0001 wt % to 0.2 wt % of the shrimp feed, the phytogenic component comprising
      encapsulated particles comprising *Quillaja saponaria*, cayenne pepper, and
      encapsulated particles comprising a star anise extract,
      wherein the encapsulated particles comprising the *Quillaja saponaria* and the encapsulated particles comprising the star anise extract comprise encapsulating shells that protect the extracts during processing and storage and provide release of the extracts in a shrimp's digestive tract; and
    a nutritional component comprising one or more vitamins, nutrients, nucleic acids, and/or nucleotides;
  a base feed component;
wherein the method is effective to prevent, reduce the occurrence of, treat, and/or facilitate recovery of white feces syndrome in the shrimp; and
wherein at least some of the shrimp have white feces syndrome, wherein the method results in a higher survival rate of the shrimp having white feces syndrome, a higher average daily gain of the shrimp having white feces syndrome, a higher specific growth rate of the shrimp having white feces, a higher feed conversion ratio of the shrimp having white feces syndrome, or a combination thereof, as compared to shrimp having white feces syndrome that are not fed the feed composition.

* * * * *